(12) United States Patent
Smith et al.

(10) Patent No.: US 7,123,649 B1
(45) Date of Patent: Oct. 17, 2006

(54) OUTDOOR UNIT PROGRAMMING SYSTEM

(76) Inventors: Peter Smith, 1103 Wilbur Ave., San Diego, CA (US) 92109; Kenneth L. Stanwood, 2403 Montgomery Ave., Cardoff by the Sea, CA (US) 92007; Christopher D. Macy, 1859 Missouri St., San Diego, CA (US) 92109; Ofer Zimmerman, Helmonit St. 6/2, Modiin (IL)

( * ) Notice: Subject to any disclaimer, the term of this patent is extended or adjusted under 35 U.S.C. 154(b) by 1075 days.

(21) Appl. No.: 09/706,195

(22) Filed: Nov. 3, 2000

(51) Int. Cl.
*H04B 1/38* (2006.01)
*H04M 11/00* (2006.01)

(52) U.S. Cl. .................. 375/222; 455/423; 455/418
(58) Field of Classification Search .............. 375/219, 375/222, 224, 354, 356, 357, 358
See application file for complete search history.

(56) References Cited

U.S. PATENT DOCUMENTS

| | | | |
|---|---|---|---|
| 3,949,404 A | 4/1976 | Fletcher et al. |
| 4,495,619 A | 1/1985 | Acampora |
| 5,297,144 A | 3/1994 | Gilbert et al. |
| 5,420,851 A | 5/1995 | Seshadri et al. |
| 5,444,698 A | 8/1995 | Kito |
| 5,511,082 A | 4/1996 | How et al. |
| 5,615,212 A | 3/1997 | Ruszczyk et al. |
| 5,638,371 A | 6/1997 | Raychaudhuri et al. |
| 5,638,374 A | 6/1997 | Heath |
| 5,675,573 A | 10/1997 | Karol et al. |
| 5,751,708 A | 5/1998 | Eng et al. |
| 5,768,254 A | 6/1998 | Papadopoulos et al. |
| 5,828,695 A | 10/1998 | Webb |
| 5,859,619 A | 1/1999 | Wu et al. |
| 5,890,055 A | 3/1999 | Chu et al. |
| 6,006,069 A | 12/1999 | Langston |
| 6,016,311 A | 1/2000 | Gilbert et al. |
| 6,016,313 A | 1/2000 | Foster, Jr. et al. |
| 6,038,455 A | 3/2000 | Gardner et al. |
| 6,094,421 A | 7/2000 | Scott |
| 6,112,080 A | 8/2000 | Anderson et al. |
| 6,505,033 B1 * | 1/2003 | Shinozaki ................ 455/68 |
| 6,757,837 B1 * | 6/2004 | Platt et al. ................ 714/4 |

OTHER PUBLICATIONS

Lin., et al., "*Error Control Coding, Fundamentals and Applications*", Prentice-Hall Computer Applications in Electrical Engineering Series., 1993, pp. 315-349.

L.H. Charles Lee, "Convolutional Coding, Fundamentals and Applications", Artech House, Inc., 1997, p. 11-51.

(Continued)

*Primary Examiner*—Kevin Kim
(74) *Attorney, Agent, or Firm*—Berkeley Law & Technology Group

(57) ABSTRACT

A system that provides a wireless broadband connection between base stations and customer sites is described. The system includes indoor units within the base stations and customer sites and communicate across cables to outdoor units. The indoor units link to routers, switches and other devices and services. The outdoor units transmit and receive wireless data and send it to the indoor units. The indoor units can store software instructions in the outdoor unit. This allows the indoor units to automatically detect problems with outdoor unit and download new software to them in case of an error.

27 Claims, 15 Drawing Sheets

OTHER PUBLICATIONS

Redl, et al., "An Introduction to GSM", Artech House, Inc., 1995; pp. 84, 85 and 95.

C.E. Shannon, "A Mathematical Theory of Communication". Bell System Technical Journal, pp. 379-423 (Part 1), 623-656 (Part II), Jul. 1948.

Ulm., et al., "Data-Over-Cable Interface Specifications, Radio Frequency Interface Specification", Hewlett Packard Interim Specification, Doc. Control No.: SP-RFII01-970321, published Mar. 21, 1997 by MCNS Holdings, L.P., Section 6, pp. 43-85.

Wolf, et al., "On the Weight Distribution of Linear Block Codes Formed From Convolutional Codes", IEEE, IEEE Transactions on Communications, vol. 44:9, Sep. 1996.

"Asynchronous Transfer Mode (ATM) Technical Overview", 2nd Edition, Prentice Hall, Oct. 1995, Chapter 3, pp. 21-25.

* cited by examiner

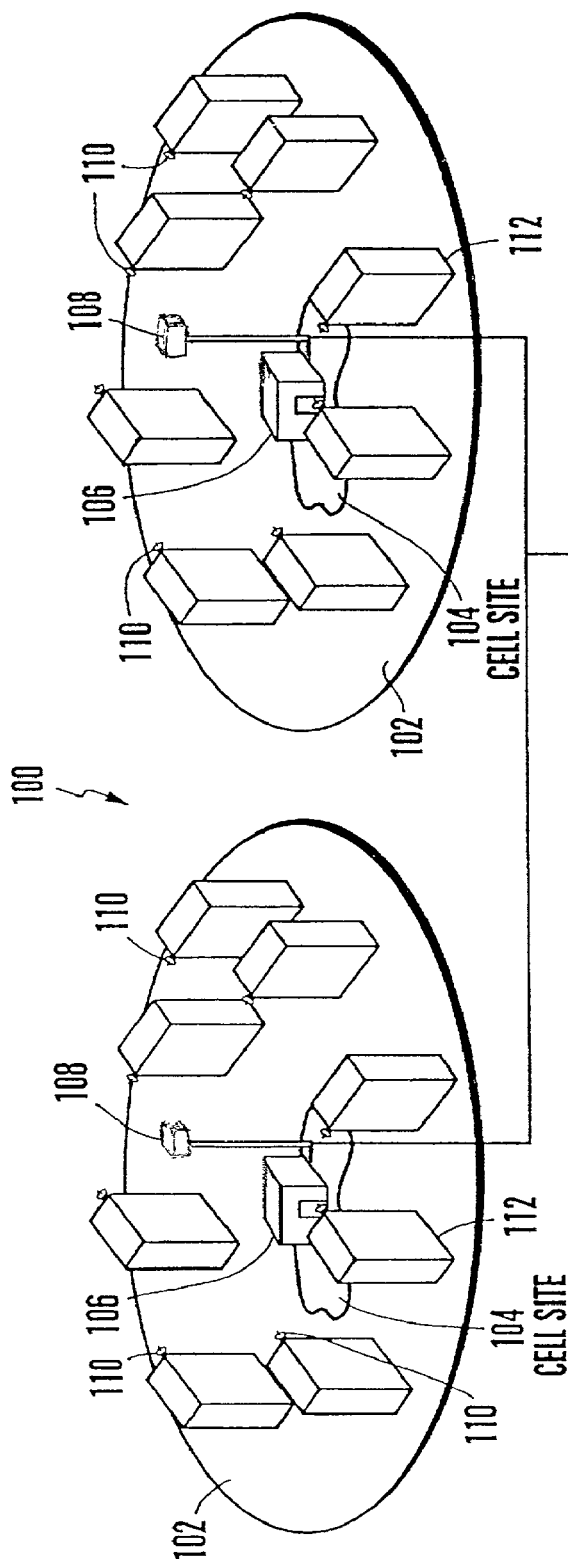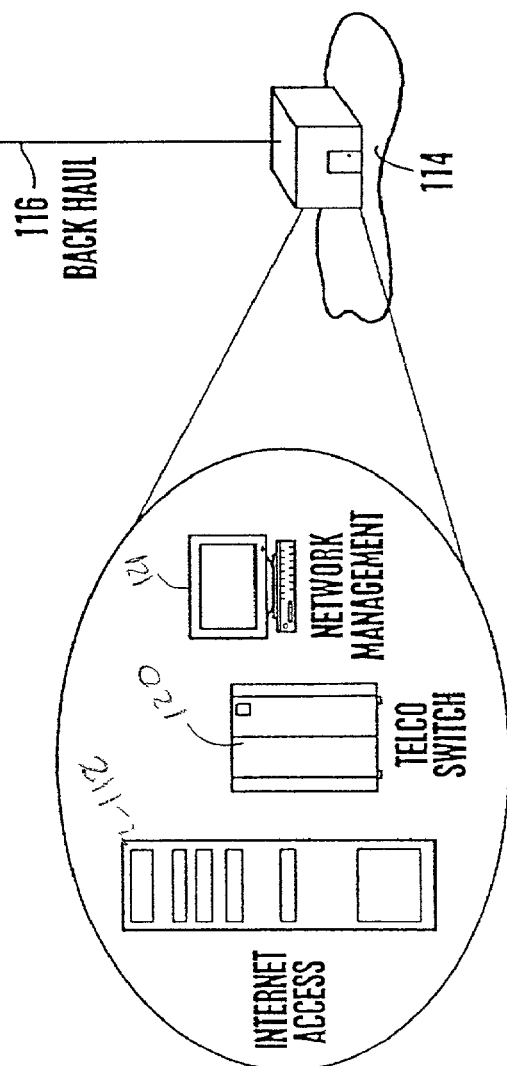
Fig. 1

Handshake between IDU and ODU during normal operation mode

OUTDOOR UNIT PROGRAMMING SYSTEM

BACKGROUND OF THE INVENTION

1. Field of the Invention

This invention relates to wireless communication systems, and more particularly to a wireless communication system that provides telephone, data and Internet connectivity to a plurality of users.

2. Description of Related Art

Several systems are currently in place for connecting computer users to one another and to the Internet. For example, many companies such as Cisco Systems, provide data routers that route data from personal computers and computer networks to the Internet along conventional twisted pair wires and fiber optic lines. These same systems are also used to connect separate offices together in a wide area data network.

However, these systems suffer significant disadvantages because of the time and expense required to lay high capacity communications cables between each office. This process is time consuming and expensive. What is needed in the art is a high capacity system that provides data links between offices, but does not require expensive communication cables to be installed.

Many types of current wireless communication systems facilitate two-way communication between a plurality of subscriber radio stations or subscriber units (either fixed or portable) and a fixed network infrastructure. Exemplary systems include mobile cellular telephone systems, personal communication systems (PCS), and cordless telephones. The objective of these wireless communication systems is to provide communication channels on demand between the subscriber units and the base station in order to connect the subscriber unit user with the fixed network infrastructure (usually a wired-line system). Several types of systems currently exist for wirelessly transferring data between two sites. For example, prior art wireless communication systems have typically used a Code Division Multiple Access (CDMA), Time Division Multiple Access (TDMA) or Frequency Division Multiple Access (FDMA) type system to facilitate the exchange of information between two users. These access schemes are well known in the art.

Some systems use a combination of indoor units that reside within a building and outdoor units that are typically mounted on the rooftop. The indoor unit connects to other devices that communicate user data across the wireless system. The outdoor unit typically is connected to an antenna for communicating with other base stations or hubs within the system. Within a conventional outdoor unit is software and hardware for controlling outdoor unit functions. As can be imagined, if the software within the outdoor unit becomes corrupted, or needs updating, it must be reprogrammed. Unfortunately, conventional outdoor unit systems are reprogrammed from serial port interfaces on the outdoor unit. This requires a technician to access the outdoor unit on the roof. Moreover, there can be a significant time lag from the time the outdoor unit software becomes disabled to the time a technician can get on site for a repair.

Accordingly, what is needed in the art is a simple, effective, on site system for reprogramming software in the outdoor unit of a wireless communication system. The present invention provides such a system.

SUMMARY OF THE INVENTION

One embodiment of the invention is customer premise equipment for use in a wireless communication system having a base station and customer sites, the customer premise equipment that includes an outdoor unit comprising: a transmit path having first tuneable sub-components; a receive path having second tuneable sub-components; a detector configured to generate a detector signal; a controller configured to receive said detector signal, to tune said first tuneable sub-components and said second tuneable sub-components in response to received commands, to transmit information representative of said detector signal in response to a command, and a memory configured to store instructions to control the operation of the controller. This embodiment further includes: an indoor unit having a modem for modulating/demodulating data transmitted between the base stations and the customer sites, said indoor unit further having a processor configured to transmit commands to said micro controller, to detect a failure in the outdoor unit, and if a failure is detected in the outdoor unit then to write new instructions to said memory.

Another embodiment is a system for storing updated software instructions to an outdoor unit in a wireless communication system, wherein the wireless communication system has a plurality of base stations and customer sites. This embodiment includes: an outdoor unit comprising software instructions stored in a memory; an indoor unit having a copy of the stored software instructions; and first instructions within the indoor unit for detecting a failure in the outdoor unit and, responsive to said failure, storing new software instructions to the memory in said outdoor unit.

One other embodiment of the invention is a method for updating software instructions in an outdoor unit of a wireless communication system, wherein the wireless communication system has a plurality of base stations and customer sites, including: detecting a failure of the outdoor unit to properly initialize; reading software instructions from one or more memory partitions in the outdoor unit; comparing the read software instructions with a stored copy the instructions; identifying any altered memory partitions that comprise instructions differing from the stored copy; and storing new software instructions to the altered memory partitions.

Still another embodiment of the invention is a method for programming an outdoor unit of a wireless communication system, wherein the wireless communication system has a plurality of base stations and customer sites. This embodiment provides: instructing the outdoor unit to change to a designated operational mode; determining whether the outdoor unit changes to the designated operational mode, wherein a determination that the outdoor unit did not change indicates an outdoor unit failure; reading software instructions from one or more memory partitions in the outdoor unit; comparing the read software instructions with a stored copy the instructions; identifying any altered memory partitions that comprise instructions differing from the stored copy; and storing new software instructions to the altered memory partitions.

BRIEF DESCRIPTION OF THE DRAWINGS

FIG. 1 is a block diagram of an exemplary broadband wireless communication system for use with the present invention.

Like reference numbers and designations in the various drawings indicate like elements.

DETAILED DESCRIPTION OF THE INVENTION

Figure 2:
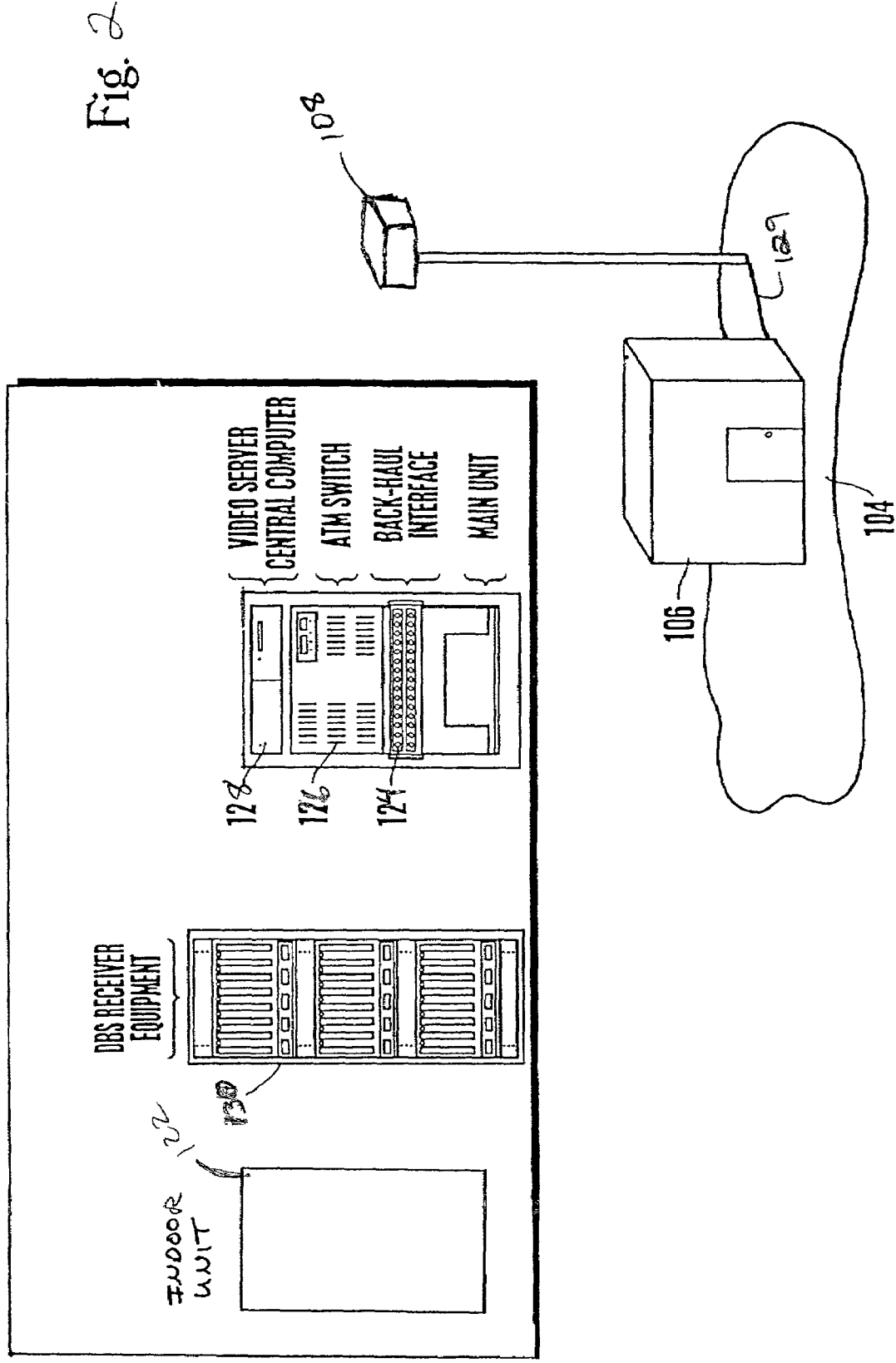
FIG. 2 is a block diagram of cell site used in the wireless communication system of FIG. 1.

Throughout this description, the preferred embodiment and examples shown should be considered as exemplars, rather than as limitations on the present invention.

A. Overview of the Wireless Communication System

As described above, embodiments of the present invention relate to a broadband wireless communication system. The system is particularly useful for linking a plurality of customers and businesses together to share data or access the Internet. In general, the system provides base stations that are centrally located from a plurality of customer sites. The base stations are linked to services desired by customers, such as Internet access, satellite access, telephone access and the like. Within the base stations are communication devices, such as routers, switches and systems for communications with the desired services. In addition, each base station includes one or more antennas for connecting wirelessly with one or more customer sites.

A customer desiring, for example, access to the Internet will install a set of Customer Premises Equipment (CPE) that includes an antenna and other hardware, as described in detail below, for providing a high speed wireless connection to one or more base stations. Through the high-speed wireless connection, the customer is provided with access to the Internet or to other desired services. As discussed below, the data transmitted wirelessly between a base station and a customer site is termed herein "user data". Of course, at each customer site, a plurality of simultaneous computers can be provided with wireless access to the base station through the use of hubs, bridges and routers.

In one preferred embodiment, the base station comprises a plurality of indoor units that provide an interface between the routers, switches and other base station equipment and a plurality of outdoor units (ODU) that transmit/receive data from the customer sites. Each indoor unit typically includes, or communicates with, a modem for modulating/demodulating user data going to/from the outdoor unit.

Preferably, each of the indoor units is connected to only one outdoor unit and each IDU/ODU pair transmits and receives user data with a unique frequency. This format provides a base station with, for example, 10, 20, 30 or more IDU/ODU pairs that each communicate with customer sites using unique frequencies. This provides the base station with a means for communicating with many customer sites, yet dividing the bandwidth load between several frequencies. Of course, a base station that servers a small community of customer sites might only have a single IDU/ODU pair.

Each ODU at the base station is normally located outside of the physical building and includes an integrated broadband antenna for transmitting/receiving wireless user data packets to/from the customer sites. Of course, the antenna does not need to be integrated with the ODU, and in one embodiment is located external to the ODU.

The ODU and the IDU communicate with one another through a broadband cable connection, such as provided by an RG-6 cable. In one embodiment the ODU and IDU communicate across about 10 to 100 feet of cable. In another embodiment, the ODU and IDU communicate across about 100 to 500 feet of cable. In yet another embodiment, the ODU and the IDU communicate across about 500 to 1000 feet of cable.

In one embodiment, the IDU controls functions within the ODU by sending control messages in addition to the user data stream. The IDU passes messages to the ODU in order for the IDU to control certain aspects of the ODU's performance. For example, the IDU may determine that the system needs to be tuned in order to maximize the signal strength of the user data being received. The IDU will send a control message in the form of a frequency shift key (FSK) modulated signal, as described below, to the ODU along the broadband cable. The control message preferably includes the identity of a variable voltage attenuator (VVA) or other type of attenuator in the ODU and a new setting for the designated VVA. An onboard micro controller in the ODU reads and interprets the control message coming from the IDU and sends the proper signals to the designated VVA.

Once the ODU has adjusted the designated VVA, the micro controller in the ODU sends a response in the form of a response message back along the broadband cable to the IDU. The response message preferably includes a confirmation of the new VVA setting, or other data to confirm that the requested control message has been fulfilled. The following discussion provides a detailed listing and the structure of exemplary control messages and response messages that can be transmitted between the IDU and the ODU.

It should be realized that the base stations and the customer sites each have indoor units and outdoor units that function similarly to provide a communication link between the external antenna and the electronic systems in the interior of the buildings. Of course, in one embodiment within the customer sites, the indoor units are connected through routers, bridges, Asynchronous Transfer Mode (ATM) switches and the like to the customer's computer systems, which can also include telecommunication systems. In contrast, within the base stations the indoor units are connected to the routers, switches and systems that provide access to the services desired by the customers.

Referring now to FIG. 1, a wireless communication system 100 comprises a plurality of cells 102. Each cell 102 contains an associated cell site 104 which primarily includes a base station 106 having at least one base station indoor unit (not shown). The base station receives and transmits wireless user data through base station outdoor units 108. A communication link transfers control signals and user data between the base station indoor unit (IDU) and the base station outdoor unit (ODU). The communication protocols between the base station IDU and base station ODU will be discussed more thoroughly in the following sections.

Each cell 102 within the wireless communication system 100 provides wireless connectivity between the cell's base station 106 and a plurality of customer premises equipment (CPE) located at fixed customer sites 112 throughout the coverage area of the cell 102. The customer premises equipment normally includes at least one indoor unit (not shown) and one customer ODU 110. Users of the system 100 can be both residential and business customers. Each cell will preferably service approximately 1,000 residential subscribers and approximately 300 business subscribers. As will be discussed below, each customer ODU 110 is positioned to receive and transmit user data from and to the base station ODU 108. As discussed above, the customer IDU (not shown) is located within the site 112 and provides a link between the customer's computer systems to the ODU.

As shown in FIG. 1, the cell sites 104 communicate with a communications hub 114 using a communication link or "back haul" 116. The back haul 116 preferably comprises either a fiber-optic cable, a microwave link or other dedicated high throughput connection. In one embodiment the communications hub 114 provides a data router 118 to interface the wireless communications network with the Internet. In addition, a telephone company switch 120 preferably connects with the communications hub 114 to provide access to the public telephone network. This provides wireless telephone access to the public telephone network by the customers. Also, the communications hub 114 preferably provides network management systems 121 and software that control, monitor and manage the communication system 100.

The wireless communication of user data between the base station ODU 108 and customer ODU 110 within a cell 102 is advantageously bi-directional in nature. Information flows in both directions between the base station ODU 106 and the plurality of Customer ODU 110. The base station ODU 106 preferably broadcasts single simultaneous high bit-rate channels. Each channel preferably comprises different multiplexed information streams. The information in a stream includes address information which enables a selected Customer ODU 110 to distinguish and extract the information intended for it.

The wireless communication system 100 of FIG. 1 also preferably provides true "bandwidth-on-demand" to the plurality of Customer ODU 110. Thus, the quality of the services available to customers using the system 100 is variable and selectable. The amount of bandwidth dedicated for a given service is determined by the information rate required by that service. For example, a video conferencing service requires a great deal of bandwidth with a well controlled delivery latency. In contrast, certain types of data services are often idle (which then require zero bandwidth) and are relatively insensitive to delay variations when active. One mechanism for providing an adaptive bandwidth in a wireless communication system is described in U.S. Pat. No. 6,016,211 issued on Jan. 18, 2000, the disclosure of which is hereby incorporated by reference in its entirety.

1. Cell Site

FIG. 2 illustrates a block diagram of the cell site 104 of FIG. 1 used in the wireless communication system 100. As described above, the cell site 104 preferably comprises the base station 106 and at least one base station ODU 108. As shown in FIG. 2, the base station also preferably includes at least one base station indoor unit 122, back-haul interface equipment 124, an Asynchronous Transfer Mode (ATM) switch 126, a video server control computer 128 and direct broadcast satellite (DBS) receiver equipment 130. The base station can also alternatively include a video server (not shown in FIG. 2). The indoor unit 122 sends control messages and user data to the ODU. The indoor unit 122 also receives response messages and user data from the base station outdoor unit 108.

The back-haul interface equipment 124 allows the base station to bi-directionally communicate with the hub 114 (FIG. 1). The ATM switch 126 functions at the core of the base station 106 to interconnect the various services and systems at appropriate service and bandwidth levels.

The base station 106 is preferably modular in design. The modular design of the base station 106 allows the installation of lower capacity systems that can be upgraded in the field as capacity needs dictate. The IDU 122 in conjunction with the ODU 108 performs both the media access protocol layer and the modulation/de-modulation functions that facilitate high-speed communication over the wireless link. The IDU 122 preferably is connected via a broadband cable 129 to the base station outdoor unit 108 which is preferably mounted on a tower or a pole proximate the base station 106. The base station outdoor unit 108 preferably contains high-frequency radio electronics (not shown) and antenna elements for transmitting user data to the customer sites.

2. Indoor Unit

Figure 3:
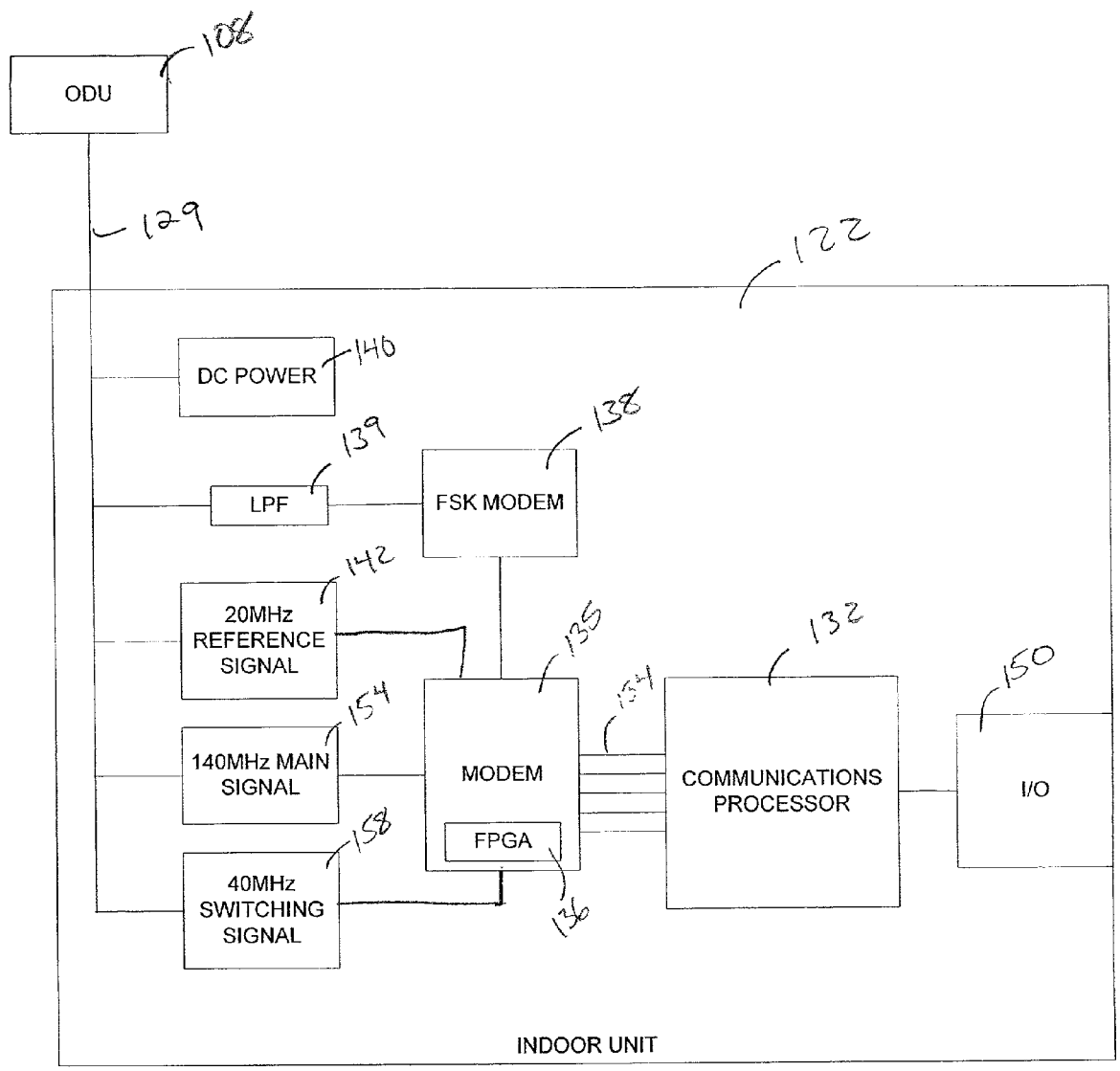
FIG. 3 is a block diagram of an embodiment of an Indoor Unit module from the cell site illustrated in FIG. 2.

Referring to FIG. 3, a more detailed block diagram of the indoor unit 122 is provided. As illustrated, the indoor unit 122 links the base station equipment 124, 126, 128, and 130 to the base station outdoor unit 108. The IDU 122 is preferably under the control of a communications processor 132. One preferred processor is the Motorola MPC8260 PowerQUICC II (PQII). As illustrated, the communications processor 132 connects through a PowerPC bus 134 to a modem 135.

The modem 135 includes a Field Programmable Gate Array (FPGA) 136 that stores instructions for controlling other subcomponents of the IDU 122. For example, the FPGA 136 communicates with a Frequency Shift Key (FSK) modem 138 in order to send FSK modulated control messages from the IDU through the broadband cable 129, to the outdoor unit 108. A low band pass filter 139 is provided between the cable 129 and the FSK modem 138. In an alternate embodiment, an Application Specific Integrated Circuit (ASIC) replaces the FPGA in order to provide similar functions.

As is discussed in detail below, the IDU and ODU communicate with one another using messages. The IDU sends control messages to the ODU, and the ODU responds with response messages. This communication allows the IDU to request data from ODU detectors, and then send commands instructing the ODU to reset subcomponents in order to be more efficient.

Thus, control messages are FSK modulated and sent from the IDU to the ODU. Similarly, response messages from the ODU to the IDU are demodulated by the FSK modem 138 and then interpreted by instructions with the FPGA 136. These control messages and response messages, and their data structure and format, are discussed in detail below. In one embodiment, the transmission baud rate of the FSK modem 138 is 115 kbps with one start bit, one stop bit and one parity bit. Of course, other data transfer speeds and formats are contemplated to be within the scope of the invention. Moreover, the FSK modem 138 preferably transmits and receives in frequencies between 6–8 MHz.

Messages between the IDU and ODU are preferably transmitted independently of the other signals being passed along the cable 129. In one embodiment, the ODU acts like a slave in that it does not originate messages, but only responds to control messages it receives from the IDU.

As illustrated, power is provided to the ODU through a DC power supply 140 that provides, in one embodiment, 48V DC to the ODU. A 20 MHz reference signal 142 is also transmitted across the cable 129 in order to keep components in the IDU and ODU synchronized with one another.

The communications processor 132 is also linked to an Input/Output port 150 that attaches to the routers, switches and systems within the base station. The communications processor 132 receives packet data from the Input/Output port 150 and transmits it to a modem 153 for modulation demodulation. The modulated data signal is then placed on a 140 MHz main signal 154 for high throughput transmission to the ODU 108. It should be realized that the data transmission along the 140 MHz main signal can occur simultaneously with the control message and response message data that is Frequency Shift Key modulated across the cable 129.

In order for the IDU and ODU to effectively and rapidly switch between receiving and transmitting data modes, a 40 MHz switching signal 158 is also linked to the communications processor 132 and carried on the cable 129. The 40 MHz switching signal 158 is used within the system to switch the ODU and IDU between transmit and receive modes, as will be discussed below with reference to FIG. 4.

In one embodiment, if the 40 MHz signal is present, the ODU and IDU enter transmit mode to send user data from the base station ODU to customer ODUs. However, if the 40 MHz signal is not present, the ODU and IDU enter receive mode wherein user data being transmitted from other ODU's is received by the base station ODU. The timing of the switching signal is controlled by instructions residing in the FPGA 136. For example, in a half-duplex Time Division Duplex architecture, the switching signal 158 is preferably set to switch between receive and transmit modes. However, in a full duplex architecture where user data is constantly being received, the switching signal 158 can be programmed to switch between a transmit mode and a null mode.

3. Outdoor Unit

Figure 4:
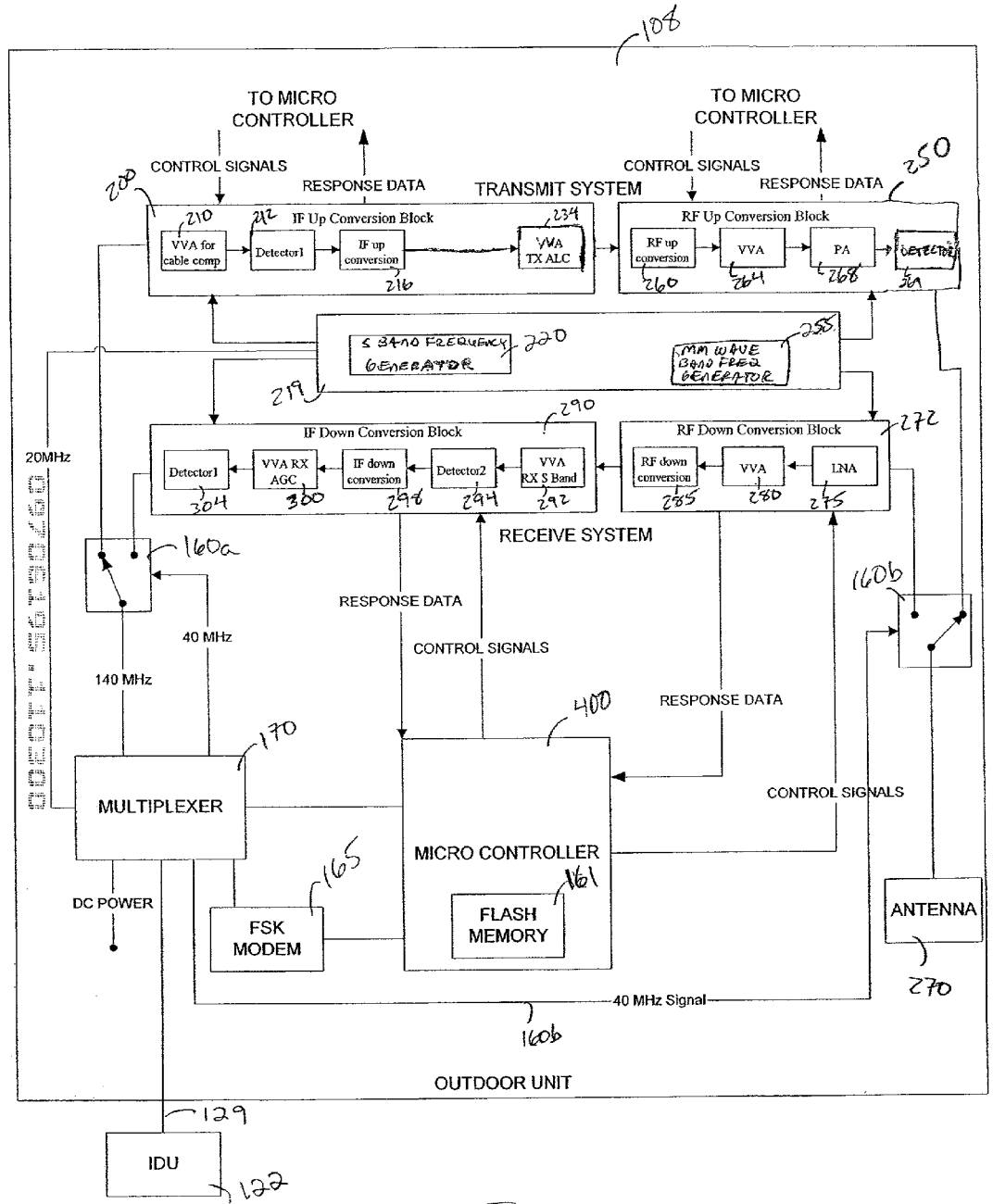
FIG. 4 is a block diagram of an embodiment of an Outdoor Unit module from the cell site illustrated in FIG. 2.

Now referring to FIG. 4, a more detailed block diagram of the outdoor unit 122 is provided. As illustrated, the outdoor unit 122 receives control messages and user data from the IDU across the cable 129. Depending on the state of the 40 MHz switching signal 142 (shown in FIG. 3), a set of switches 160*a,b* in the ODU are either in transmit or receive mode. In transmit mode, user data and control messages are sent from the IDU to the ODU. In receive mode, user data and response messages are sent from the ODU to the IDU. As illustrated and discussed with reference to FIG. 5, a microcontroller 400 is linked to the components within the ODU in order to manage data flow.

The microcontroller 400 communicates with a multiplexer 170 that separates the signals carried on the cable 129. Within the microcontroller 400 is a programmable memory 161 that stores instructions for gathering the response data and forming response messages for transmission to the IDU. In addition, the instructions within the memory 161 read incoming control messages from the IDU and send control signals to sub-components of the ODU. A FSK modem 165 is connected to the multiplexer 170 and microcontroller 400 for modulating/demodulating messages to/from the IDU.

a. Transmit Mode

If the ODU is in transmit mode, the modulated user data being sent from the IDU along the 140 MHz main signal is first routed through the multiplexer 170 to the switch 160*a*. If the switch is set to transmit mode, the main signal is sent to an IF UP CONVERSION block 200 that converts the 140 MHz signal to an approximately 2.56 GHz (S band) signal. As illustrated, the IF UP CONVERSION block 200 first provides a variable voltage attenuator (VVA) 210 that is used to compensate for frequency fluctuations from transmission along the cable 129. The signal then passes to a detector 212 that measures power levels after compensation at the cable input.

Although the following discussion relates to a system that transmits user data within the millimeter wave band at frequencies of approximately 28 GHz, the system is not so limited. Embodiments of the system are designed to transmit user data at frequencies, for example, of 10 GHz to 66 GHz.

The user data signal is then up-converted to an S band signal at an IF UP CONVERSION block 216 through an associated local oscillator block 219. The local oscillator block 219 preferably includes an S band frequency generator 220. In one embodiment, the frequency generator 220 includes a National Semiconductor LMX 2301 or Analog Devices ADF41117. The signal is then sent through a second VVA 234 that is used for power adjustment at the S band frequency.

Once the signal has been up-converted to the S band frequency, it is sent to an RF UP CONVERSION block 250. The RF UP CONVERSION block 250 links to a millimeter wave band frequency generator 255 within the local oscillator block 219 for up-converting the 2.56 GHz signal to an approximately 28 GHz signal. The up-converted signal is then passed through a VVA 264 to provide for millimeter wave band power adjustment. Once the signal has been adjusted by the VVA 264 it is sent to a Power Amplifier 268 and then to an output power detector 269. The signal is finally passed through the switch 160*b* and out an antenna 270.

b. Receive Mode

If the ODU is in receive mode, user data is received along a 28 GHz signal (LMDS band) and passed through the antenna 270 and into an RF DOWN CONVERSION BLOCK 272. Within the RF DOWN CONVERSION BLOCK 272 is a Low Noise Amplifier (LNA) 275 which boosts the received 28 GHz signal. The signal is then sent to a VVA 280 for power adjustment at the millimeter wave band after the LNA 275. The received 28 GHz signal is then sent to a RF down converter 285 for down conversion to a 2.56 GHz (S band) signal. The RF down converter 285 communicates with the Local Oscillator block 219 to reduce the incoming signal to the S band range.

After the received signal has been down converted to 2.56 GHz, it is transmitted to an IF DOWN CONVERSION block 290. Within the IF DOWN CONVERSION BLOCK 290 is a VVA 292 for adjusting the power at the S band prior to down conversion. Following adjustment by the VVA 292, the received signal is passed to a detector 294 for measuring power leakage from the transmission path during signal transmission. The signal is then passed to an IF down converter 298 which uses the local oscillator block 219 to down convert the S band signal to a 140 MHz signal for transmission across the cable 129.

After being converted to a 140 MHz signal, the received user data is passed through another VVA 300 for power adjustment at the low frequency band and then a detector 304 to measuring power levels before transmission across the cable 129 (4 dBm at the cable output).

C. Message Traffic Between the ODU and IDU

It should be realized that the control messages sent by the IDU to the ODU can control components of the ODU. For example, in a preferred embodiment, the controlled components in the ODU are the VVAs and frequency synthesizers. Response messages from the ODU to the IDU are also generated to include data from the detectors, temperature sensor and other components described above. As can be imagined, control messages are sent by the IDU and then interpreted by the microcontroller in the ODU. After interpreting the message, the microcontroller sends the appropriate adjustment signals to components of the ODU.

Figure 5:
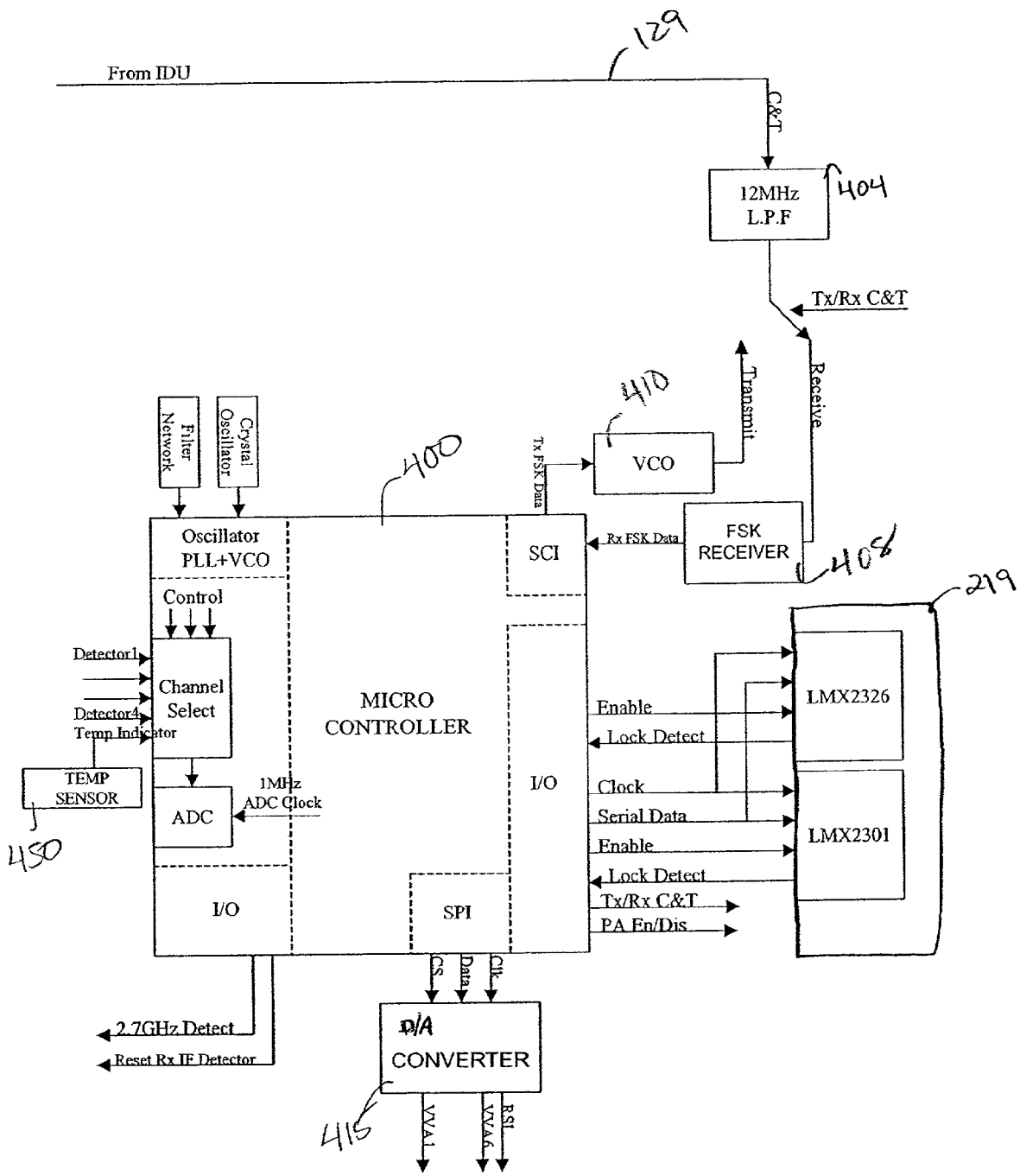
FIG. 5 is a block diagram of an embodiment of the micro controller circuitry within the Outdoor unit.

Referring to FIG. 5, a hardware schematic of circuitry within the ODU is illustrated. As shown, the ODU is controlled by the micro controller 400 that manages data flow within the ODU. In one embodiment, the micro controller is a Motorola MC68HC908GP20 high-performance 8-bit micro controller. Control messages from the IDU are sent across the cable 129 to the micro controller 400 in the ODU and then forwarded to the appropriate ODU component. In addition data signals generated by the ODU components, such as detectors, are sent from the component to the micro controller 400. The micro controller 400 builds a response message that is then transmitted via FSK modulation to the IDU.

As shown in FIG. 5, messages are sent from the IDU along the cable 129 through a 12 Mhz low pass filter 404 to a FSK receiver 408 in the ODU. In one embodiment, the FSK receiver is a Motorola MC13055 FSK receiver. The receiver 408 accepts the FSK modulated data from the IDU and inputs it into the micro controller 400. As also indicated, the micro controller 400 outputs response messages to the IDU through a voltage controller oscillator 410.

The micro controller 400 is also in communication with the local oscillator block 219. In addition a digital to analog (D/A) converter 415 communicates with the micro controller 400 in order to control the VVAs within the ODU. In one embodiment, the D/A converter is an Analog Devices model AD8803 D/A converter.

The micro controller 400 also provides an input from a temperature sensor in order to provide for temperature compensation of the ODU measurements. In one embodiment, the temperature sensor is a National Semiconductor LM50 temperature sensor.

As discussed previously, the IDU transmits FSK modulated control messages to the ODU to control particular components. The structure and format of the control messages sent by the IDU and the response messages returned by the ODU are discussed in detail below.

B. Message Format

In one embodiment, the maximum data rate of FSK modulated messages that can be handled by the Micro Controller is 125 Kbps. However, in a more preferred embodiment, and for compatibility with a conventional personal computer, FSK data is transmitted at a 115.2 kbps data rate. Accordingly, the protocol between the Micro Controller 400 and communications processor 124 can be kept as simple as possible and at the same time flexible for future changes. The message structure presented in the following section takes into account this flexible simplicity. In general, the messages passed between the ODU and the IDU are delivered byte after byte with no delay. In one embodiment, in the ODU, a time gap of more then 0.5 msec between bytes will cause the ODU to re-synchronize on the next preamble.

1. Message Structure

In the preferred data format, each message, starts with a fixed preamble that is used to identify the beginning of a message. Following the preamble an identifier is sent. The identifier is unique per message, i.e., a specific identifier defines completely the structure of the following message information fields.

The variable information within each message is preferably sent after the identifier. In addition, a CRC is added at the end of each message as an integrity check of the message. The Micro Controller 400 (see FIGS. 4 and 5) in the ODU receives a control message from the IDU, controls the required components in the ODU and prepares a response message. As soon as the IDU finishes sending the control message to the ODU, it switches from transmit mode to receive mode. The ODU then begins to transmit FSK modulated response messages to the IDU.

The preferred data structure of the messages are as follows:

| Preamble | Identifier | Information | CRC-8 |
|---|---|---|---|

Preamble—the preamble is 1 Byte field and it is always 00.

Identifier—the identifier is 1 Byte field and unique for each message.

Information—the information filed is variable length according to the message data being sent. The information field is always padded to be an integer number of bytes.

CRC-8—added for each message for error control. In the IDU, the CRC-8 is implemented inside the FPGA 130 (FIG. 3). The CRC-8 is implemented in software in the ODU Micro Controller 400 (FIGS. 4 and 5).

In general, the messages are delivered byte after byte with no delay. When the ODU detects an error, it waits until the next preamble. No response messages are sent back from the ODU to the IDU.

2. Message Traffic

In order to keep the protocol simple, only one control message and one response message are preferably used during normal operation mode. This "MEGA" control message/response message includes all the possible basic control/response messages. Additional control messages are needed for such functions such as software updates and technical information such as IDU, ODU serial numbers and software versions. If new control or response messages are needed in the future, they can be easily implemented by following the data structure represented above. Table 1 lists preferable control/response messages and their unique identifiers.

TABLE 1

Control and Response Messages

| Message | Direction | Identifier |
|---|---|---|
| Master | IDU ⇔ ODU | 0x11 |
| Identify | IDU ⇒ ODU | 0x12 |

TABLE 1-continued

Control and Response Messages

| Message | Direction | Identifier |
|---|---|---|
| Identity | IDU ⇐ ODU | 0x21 |
| Unexpected Message | IDU ⇐ ODU | 0x22 |
| Set Mode | IDU ⇔ ODU | 0x33 |
| Test Control | IDU ⇒ ODU | 0x34 |
| Download Control | IDU ⇒ ODU | 0x35 |
| Download_Ack Control | IDU ⇐ ODU | 0x53 |
| Tune Control | IDU ⇔ ODU | 0x66 |
| Mega Control | IDU ⇒ ODU | 0x96 |
| Mega Response | IDU ⇐ ODU | 0x69 |
| Mega VVA | IDU ⇒ ODU | 0x97 |
| Mega Det | IDU ⇐ ODU | 0x79 |
| Cal Table Segment | IDU ⇒ ODU | 0x44 |
| Code Segment | IDU ⇒ ODU | 0x55 |
| Segment Received | IDU ⇐ ODU | 0x45 |

In the following tables that describe message data fields, it is assumed that the messages start with a preamble and identifier, and end with an 8 bit CRC that is aligned to be in it's own byte.

a. Master Control Message

The Master control message is used in the initialization state for an IDU to identify itself as a Master IDU. During a master IDU configuration, the CPE preferably monitors the IDU/ODU link for a few milliseconds to determine if there is already a master present. The ODU then responds with the same message.

TABLE 2

Master Control Message

| Field | Bits | Description |
|---|---|---|
| IDU Identifier | 32 | 32 bit identifier of the IDU. Used to distinguish between multiple CPEs in an MDU. | b. Identify Control Message

The Identify control messages has no fields, but is simply the preamble, identifier (0x12), and CRC sent from the IDU to the ODU.

c. Identity Response Message

The Identity response message is the ODU's response to the Identify control message from the IDU.

TABLE 3

Identity Response Message

| Field | Bits | Description |
|---|---|---|
| ODU_Calibrated | 8 | 0x00 ⇒ ODU has not been calibrated<br>0x01 ⇒ ODU has been calibrated |
| MaxTxPow | 8 | Transmission Power level desired minus 45. Accordingly, values from 0 to 255 represent desired values from 45 to 300. |
| MinRxPow | 8 | Minimum Receive Power |
| FrequencyBand | 8 | ODU Frequency Band in GHz<br>24 ⇒ ODU uses 24 GHz Band<br>25 ⇒ ODU uses 25 GHz Band<br>28 ⇒ ODU uses 28 GHz Band<br>31 ⇒ ODU uses 31 GHz Band |
| SW Version | 32 | ASCII Software version number.<br>Example: SW version 135 ⇒ '0', '1', '3', '5' |

TABLE 3-continued

Identity Response Message

| Field | Bits | Description |
|---|---|---|
| Flags | 8 | ODU Flags |
| | | bit 0 (MSB)  Reserved |
| | | bit 1  Reserved |
| | | bit 2  Reserved |
| | | bit 3  Reserved |
| | | bit 4  Reserved |
| | | bit 5  Reserved |
| | | bit 6  Tx MMW detector output is valid |
| | |   0    No MMW detector |
| | |   1    MMW detector valid |
| | | bit 7 (LSB)  AFC Polarity |
| | |   0    AFC Normal |
| | |   1    AFC polarity inverted | d. Unexpected Response Message

The Unexpected Response Message is the response to a valid control message which is not expected in the current mode. For example, receipt by the ODU of a Mega Control message during initialization, as could happen after a spontaneous reset of the ODU.

TABLE 4

Unexpected Response Message

| Field | Bits | Description |
|---|---|---|
| Current Mode | 8 | 0x00 = Initialization State<br>0x01 = Normal Mode<br>0x02 = Loopback Mode (obsolete)<br>0x03 = Code Download Mode (obsolete)<br>0x04 = Cal Table Download (obsolete)<br>0x05 = Normal 24 GHz (obsolete)<br>0x06 = ODU Bootstrap Mode<br>0x07 = ODU available for normal operation | e. Set Mode Control Message

The Set Mode control message is used by the IDU to change the state of the ODU. The ODU responds by repeating the Set Mode message to the IDU as a response message.

TABLE 5

Set Mode Control Message

| Field | Bits | Description |
|---|---|---|
| New Mode | 8 | 0x00 = Initialization State<br>0x01 = Normal Mode<br>0x02 = Loopback Mode<br>0x05 = Normal 24 GHz (obsolete)<br>0x06 = ODU Bootstrap Mode<br>0x07 = ODU available for normal operation | f. Test Control Message

The Test Control Message is used by the IDU to instruct the ODU to perform some kind of test operation as described below. The general form of the message is shown in the table below:

TABLE 6

Test Control Message

| Field | Bits | Description |
|---|---|---|
| Operation | 8 | The particular test being commanded |
| Data Byte 1 | 8 | Data pertinent to that command if necessary |
| Data Byte 2 | 8 | | i. Test Control Message—FSK Tone Generation

To conduct testing of the ODU it is useful to have the ODU generate either of the continuous tones corresponding to a 0 or a 1. The format is shown in the table below:

TABLE 7

Test Control Message - FSK tone generation

| Field | Bits | Description |
|---|---|---|
| Operation | 8 | 0x1 ⇒ Transmit FSK Tone |
| FSK_Tone | 8 | 0x0 ⇒ transmit the '0' tone |
| | | 0x1 ⇒ transmit the '1' tone |
| Transmit Time | 8 | Number of seconds to generate the tone (0 . . . 255) |

The FSK tone generation operation causes the ODU to generate either a continuous '0' tone, or '1' tone for the specified number of seconds.

While the tone is being generated the ODU will not respond to control messages since the link is half duplex. When the specified time has elapsed the ODU will resume listening for control messages from the IDU.

ii. Test Control Message—Request Break Status (FSK Cutoff Frequency)

This command determines from the ODU if a "break" character has been detected on the ODU/IDU message interface. The table below shows the format of this message.

TABLE 8

Test Control Message - Request Break Status

| Field | Bits | Description |
|---|---|---|
| Operation | 8 | 0x2 ⇒ Request Break Status |
| Reserved | 8 | |
| Reserved | 8 | |

In virtually all cases, the ODU responds with a Test_Command:Break_Status_Report, indicating if it has detected a "break" character since the last request or not. The message is used to test the ODU FSK receive modem function. A "break" character being detected is the result of the ODU detecting a continuous series of zeros. This can only happen by an external source injecting a pure low tone into the ODU.

The cut-off frequency of ODU receive circuitry can be determined on a test stand by injecting different frequency tones onto the response data interface and repeatedly requesting the ODU detected a "break" character. Eventually a frequency will be reached where the ODU does not detect a break—hence the cut-off can be determined.

iii. Test Control Message—Break Status Report

This message is the response to the Request Break Status and is shown in the table below:

TABLE 9

Test Control Message - Break Status Report

| Field | Bits | Description |
|---|---|---|
| Operation | 8 | 0x3 ⇒ Break Status Report |
| Break_Status | 8 | 0x0 ⇒ No break detected since previous request |
| | | 0x1 ⇒ Break detected since previous request |
| Reserved | 8 | | iv. Test Control Message—Tune Test

This message contains the response to the Test Control—Tune Test. It's layout is show below:

TABLE 10

Test Control Message - Tune test

| Field | Bits | Description |
|---|---|---|
| Operation | 8 | Base Frequency in GHz (10–60) |
| | | 27 => works for 28 GHz ODUs |
| Data Byte | 16 | Frequency offset from base in 100 kHz increments |
| | | i.e. 1 => <Base Frequency>. 0001 GHz |
| | | 1000 => <Base Frequency>. 1000 GHz |
| | | 10000 => <Base Frequency + 1>. 0000 GHz |

The Tune test message attempts to tune the ODU to the specified frequency without regard to the valid frequency range for the ODU, therefore tuning outside of the normal range is permitted. The step resolution of the command is 100 kHz. No range checking is performed so specifying values too far beyond the valid range may have unpredictable results. The ODU may not be able to tune to the precise frequency specified, when this occurs it tunes to the nearest frequency it can.

g. Tune Control Message

The Tune Control instructs the ODU to tune to a given frequency specified in units of 100 kHz. The ODU responds after performing the tuning operation by echoing the same Tune Control message back to the IDU and reporting the frequency to which the ODU is now tuned. If the specified frequency is outside the valid frequency range for the ODU, the ODU does not retune. Therefore specifying a frequency of 0 is a mechanism for querying the ODU as to the frequency to which it is tuned without changing the frequency.

The frequencies of 1 and 4294967295 (or FFFFFFFF hex) are reserved as special query-mode frequencies. If the ODU is told to tune to 0.0001 GHz, the ODU will not retune but will respond with the minimum available frequency. For instance, a 28 GHz ODU would return the number 272000. If the ODU is told to tune to 429496.7295 GHz, it will not retune but will respond with the maximum available frequency, or 286500 for a 28 GHz ODU.

TABLE 11

Tune Control Message

| Field | Bits | Description |
|---|---|---|
| Frequency | 32 | The frequency in units of 100 kHz |
| | | Eg. 28 GHz => 280,000 |
| | | 28.0001 GHz => 280,001 |

The ODU may not be able to tune to the precise in-band frequency specified, when this occurs it truncates the value to the nearest possible frequency and tunes to that frequency instead.

24 GHz ODUs can be commanded to tune from 24.0000 GHz to 25.5000 GHz.

25 GHz ODUs can be commanded to tune from 25.0000 GHz to 25.5000 GHz.

28 GHz ODUs can be commanded to tune from 27.2000 GHz to 28.6500 GHz.

31 GHz ODUs can be commanded to tune from 29.8000 GHz to 31.5000 GHz.

h. Mega Control Message

The Mega Control is used by the IDU to instruct the ODU to change the values of Attenuators or the Frequency.

TABLE 12

Mega Control

| Field | Bits | Description |
|---|---|---|
| Change Flags | 5 | 1 bit per field that may change<br>b10000 ⇒Enable/Disable PA changed<br>b01000 ⇒Rx Power Level changed<br>b00100 ⇒Tx IF1 VVA changed<br>b00010 ⇒Tx Power Level changed<br>OR values to get combinations of fields changed<br>For Example, b01010 ⇒Rx Power Level and Tx Power Level both changed. |
| Enable/Disable PA | 1 | 1 = use 40 MHz switching signal<br>0 = disable PA |
| Rx Power Level | 10 | Per Rx VVA Table in section 1.2 of [1]. |
| Tx IF1 VVA | 8 | 0 to −30.5 dB in 0.2 dB steps |
| Tx Power Level | 9 | 0 to −60 dB in 0.2 dB steps |
| LinkAcquired | 1 | 1 ⇒Link is acquired. The ODU reports the value of the RxIF1 the detector 10 used immediately following the start of the frame (corresponding to the arrival of the second byte of the Mega Control). The RSL output behaves normally, but with a minimum level of 0.5 volts 0 ⇒Link is not acquired. The ODU reports the value of the RxIF1 detector from the time period between any previous command and the current Mega Control. The RSL output is always 0 volts. |
| Padding | 14 | For byte alignment of CRC | i. Mega Response Message

The Mega Response message is the response to the Mega Control message.

TABLE 13

Mega Response Message

| Field | Bits | Description |
|---|---|---|
| Rx IF1 Detector | 8 | Temperature compensated and converted to the range −11 to 12 dBm, expressed in 0.2 dBm steps. |
| Rx IF2 Detector or Output Power Detector | 8 | Temperature compensated and converted to the range 5 dBm to 22 dBm, expressed in 0.2 dBm steps. |
| Tx IF1 Detector | 8 | Temperature compensated and converted to the range −26 to −4 dBm, expressed in 0.2 dBm steps. |
| Tx IF2 Detector | 8 | Temperature compensated and converted to the range −5 to −39 dBm, expressed in 0.2 dBm steps. |
| Temperature | 8 | −35 to 85° C. |
| Pad | 5 | For byte alignment of CRC. Can add additional alarms here in the future. |
| Ref PLL Lock | 1 | Alarm: 1 = fail |
| Syn Lock | 1 | Alarm: 1 = fail |
| 2.7 GHz Detect | 1 | Alarm: 1 = fail | j. Mega VVA Control Message

The Mega VVA Control is used by the IDU to instruct the ODU to change the values of Attenuators and the Frequency. Unlike the Mega Control message, it contains the explicit VVA settings.

TABLE 14

Mega VVA Control Message

| Field | Bits | Description |
|---|---|---|
| Rx IF1 VVA | 8 | Explicit value to set Rx IF1 VVA |
| Rx IF2 VVA | 8 | Explicit value to set Rx IF2 VVA |
| Rx MM VVA | 8 | Explicit value to set Rx MM VVA |
| Tx IF1 VVA | 8 | Explicit value to set Tx IF1 VVA |
| Tx IF2 VVA | 8 | Explicit value to set Tx IF2 VVA |
| Tx MM VVA | 8 | Explicit value to set Tx MM VVA |
| Padding | 10 | |
| Change Flags | 6 | 1 bit per field that may change<br>b100000 ⇒Rx IF1 VVA changed<br>b010000 ⇒Rx IF2 VVA changed<br>b001000 ⇒Rx MM VVA changed<br>b000100 ⇒Tx IF1 VVA changed<br>b000010 ⇒Tx IF2 VVA changed<br>b000001 ⇒Tx MM VVA changed<br>OR values to get combinations of fields changed<br>For example, b010100 ⇒Rx IF2 VVA and Tx IF1 VVA values have both changed | k. Mega Det Message

The Mega Det message is the response to the Mega VVA control.

TABLE 15

Mega Det Message

| Field | Bits | Description |
|---|---|---|
| Rx IF1 Detector | 8 | Actual detector value. |
| Rx IF2 Detector | 8 | Actual detector value. |
| Tx IF1 Detector | 8 | Actual detector value. |
| Tx IF2 Detector | 8 | Actual detector value. |
| Temperature | 8 | Actual detector value. |
| Pad | 5 | For byte alignment of CRC. |
| Ref PLL Lock | 1 | Alarm: 1 = fail |
| Syn Lock | 1 | Alarm: 1 = fail |
| 2.7 GHz Detect | 1 | Alarm: 1 = fail | l. Download Control Message

The Download Control message is used by the IDU to instruct the ODU to perform some kind of test operation. The general form of the message is shown in the table below:

TABLE 16

Download Control Message

| Field | Bits | Description |
|---|---|---|
| Operation | 8 | The particular test being commanded |
| Data Bytes | 88 | Data pertinent to that operation if necessary | i. Download Control Message—Update Block

The ODU maintains a buffer in its internal RAM for accumulating data to be written to flash memory. This is called the ROW buffer, and is preferably 64 bytes in size. It is sub-divided into 8 blocks, each of which is 8 bytes. A block is updated using this Update Block operation. The format of the operation is defined in the table below:

TABLE 17

Download Control Message - Update Block

| Field | Bits | Description |
|---|---|---|
| Operation | 8 | 2 ⇒ Update_Block |
| <reserved> | 8 | 0 |
| Offset | 8 | Offset from the start of the ROW buffer where the bytes being sent are to be placed, usually: 0, 8, 16, 24, 32, 40, 48, 56 |
| N_Bytes | 8 | Number of bytes to be copied to the ROW buffer (0 . . . 8) |
| Data_Bytes | 64 | Up to 8 bytes of data to be written sequentially to the ROW buffer | ii. Download Control Message—Write_Row

This message initiates an attempt to write the current content of the ROW buffer in the ODU to flash memory. The format of the operation is defined in the table below:

TABLE 18

Download Control Message - Write Row

| Field | Bits | Description |
|---|---|---|
| Operation | 8 | 3 ⇒ Write_Row |
| Flash_Address | 16 | Address in flash memory where the ROW buffer should be written. Must be a multiple of 64, and not be within the area reserved for the Boot_Module. |
| <reserved> | 72 | | iii. Download Control Message—Peek Memory

This message reads up to 4 bytes from the specified address in memory. The format of the operation is defined in the table below:

TABLE 19

Download Control Message - Peek Memory

| Field | Bits | Description |
|---|---|---|
| Operation | 8 | 4 ⇒ Peek Memory |
| Address | 16 | Address in memory from which the bytes are to be retrieved. |
| N_Bytes | 8 | Number of bytes (up to 4 to be retrieved). |
| <reserved> | 64 | | iv. Download Control Message—Software Reset

This message instructs the ODU software to reset. Control is immediately passed through to the address specified in the reset vector. This mimics behavior at power up. There can be a response to this message. If successful, the ODU will behave as is it has just powered on, if not, it will still be in the same state it was before the reset command had been issued. The format of Software_Reset is defined in the table below:

TABLE 20

Download Control Message - Get_Partition_Info

| Field | Bits | Description |
|---|---|---|
| Operation | 8 | 8 ⇒ Software Reset |
| <reserved> | 88 | | v. Download Control Message—Get_Partition_Info

This message requests partition information on the specified partition number. The ODU responds with a download_ack:partition_info_report message containing the partition information requested. The format of get_partition_info is defined in the table below:

TABLE 21

Download Control Message - Get_Partition_Info

| Field | Bits | Description |
|---|---|---|
| Operation | 8 | 9 ⇒ A Get_Partition_Info |
| Partition_number | 8 | The partition number being requested 0 . . . 255 |
| <reserved> | 80 | | vi. Download Control Message—Request_CRC

This message requests the ODU to calculate a 16 bit CRC be calculated over the specified range. The IDU uses the request to verify a partition after it has been downloaded. The ODU responds with a download_ack:CRC_Report message containing the calculated CRC. The format of packet is defined in the table below:

TABLE 22

Download Control Message - Request_CRC

| Field | Bits | Description |
|---|---|---|
| Operation | 8 | 12 ⇒ Request_CRC |
| Start Address | 16 | The address to start the 16-bit CRC calculation |
| Length | 16 | The number of bytes to run the check |
| <reserved> | 56 | | vii. Download Control Message—Get_Row_Buffer_Address

This message requests the address of the ODU ROW buffer. It is used by external software manipulating configuration and hardware parameters to retrieve the values of individual parameters from the ROW buffer using the Download:Peek_Memory command as its most primitive operation. The ODU responds with a Download_Ack: Row_Buffer_Address packet. The format of Get_Row_Buffer_Address is defined in the table below:

TABLE 23

Download Control Message - Get_Row_Buffer_Address

| Field | Bits | Description |
|---|---|---|
| Operation | 8 | 21 ⇒ Get_Row_Buffer_Address |
| <reserved> | 88 | | m. Download_Ack Control Message

This message contains the response from the ODU to download commands that generate a response.

i. Download_Ack Control Message—Memory_Report

This message is the response to a download:peek_memory command. It returns up to 4 bytes from the specified address in memory. The format of the operation is defined in the table below:

TABLE 24

Download_Ack Control Message - Memory_Report

| Field | Bits | Description |
|---|---|---|
| Operation | 8 | 5 ⇒ Memory Report |
| Address | 16 | Address in memory where these bytes originate. |
| N_Bytes | 8 | Number of bytes present. |
| Data bytes | 32 | |
| <reserved> | 16 | | ii. Download_Ack Control Message—Partition_Info_Report

This message is the response to a download_get_partition_info command. It returns partition information for the partition number requested. The format of partition_info_report is defined in the table below:

TABLE 25

Download_Ack Control Message - Partition_Info_Report

| Field | Bits | Description |
|---|---|---|
| Operation | 8 | 10 ⇒ Partition_Info_Report |
| Partition_number | 8 | The partition number being described 0 . . . 255 |
| Base_Address | 16 | The starting address of the partition 0 - 0xffff |
| Type | 8 | 'O' => Operational Software<br>'C' => Calibration tables<br>'H' => Hardware parameters<br>'B' => Bootstrap module |
| Is_Valid | 8 | 0 => the partition is invalid<br>1 => the partition is valid |
| Write_Count | 16 | Number of times this partition has been written |
| Version_Number | 8 | A version number indicating the revision of the partition content 0 . . . 255 | iii. Download_Ack Control Message—Row_Written

This message describes the ODU result of a Download:Write_Row processed by the ODU. Normally a write will succeed and the status below will return 0. If one or more blocks were not updated, or the ODU was unable to write all the blocks to flash memory correctly, it will respond with a status of 1, and the "Bit_Vector" field will indicate which blocks the ODU has. A '1' in a bit position indicates the block is present, a '0' indicates its absence. The remedy to this condition is to resend the missing blocks, and the attempt the write again. The format is shown below:

TABLE 26

Download_Ack Control Message - Row_Written

| Field | Bits | Description |
|---|---|---|
| Operation | 8 | 11 ⇒ Row_Written |
| Flash_Address | 16 | the address in flash memory where the write was attempted. |
| Status | 8 | 0 = row was written successfully to flash memory<br>1 = some blocks in the ROW have not been updated, "Bit_Vector" indicates which blocks are missing<br>2 = the write to flash was not successful, the Bit_Vector field indicates which blocks were not written. This can happen as the write count of the ODU flash memory approaches its 100 cycle limit. In an operational system this is indicates that ODU behavior may become erratic.<br>3 ==> the flash address is not a legitimate address for the ODU<br>4 = flash contents at "flash_address" already contained the ROW buffer content, no write was performed |

TABLE 26-continued

Download_Ack Control Message - Row_Written

| Field | Bits | Description |
|---|---|---|
| Bit_Vector | 8 | If status = 1 or 4, bit vector contains a 0 in each bit position where a block is missing. Block offset 0 is the LSB, block offset 56 is the MSB |
| <reserved> | 16 | | iv. Download_Ack Control Message—CRC_Report

This message reports a 16 bit CRC calculated by the ODU in response to a previous Download:Request_CRC command. The format of packet is defined in the table below. The ODU includes the starting address and the length to identify the CRC being reported.

TABLE 27

Download_Ack Control Message - CRC_Report

| Field | Bits | Description |
|---|---|---|
| Operation | 8 | 13 ⇒ CRC_Report |
| Start_Address | 16 | The address to start the 16-bit CRC calculation |
| Length | 16 | The number of bytes to run the check |
| Reported_Value | 16 | The calculated CRC value |
| <reserved> | 16 | | v. Download_Ack Control Message—Block_Updated

This message is in response to a previous Download:Update_Block. The format of the packet is defined in the table below. There are no conditions when an update should not be successful. The only possibility for not receiving a Download_Ack:Block_Updated message is that the ODU did not receive the Download:Update_Block request. The remedy is to re-send the packet.

TABLE 28

Download_Ack Control Message - Block_Updated

| Field | Bits | Description |
|---|---|---|
| Operation | 8 | 14 ⇒ Block_Updated |
| <reserved> | 8 | 0 |
| Block_Offset | 8 | Offset from the start of the ROW buffer where the bytes being sent are to be placed, may be one of: 0, 8, 16, 24, 32, 40, 48, 56 |
| N_Bytes | 8 | Number of bytes to be copied to the ROW buffer (0 . . . 7) |
| Status | 8 | 0 = Successfully copied, non-zero an error occurred |
| <reserved> | 32 | | vi. Download_Ack Control Message—Row_Buffer_Address

This message is the response to the Download:Get_Row_Buffer_Address command. It provides the absolute address of the Row buffer, which is where Calibration and Hardware parameters are maintained at runtime. This enables suitable external software to make temporary changes to the operating values of these parameters and observer their effect on the system, without writing them to flash memory (an operation most often performed when an ODU is being calibrated). The format of the packet is defined in the table below:

TABLE 29

Download_Ack Control Message - Row_Buffer_Address

| Field | Bits | Description |
|---|---|---|
| Operation | 8 | 22 ⇒ Row_Buffer_Address |
| Address | 16 | The Address of the Row buffer |
| <reserved> | 72 | |

3. Error Detection

When the ODU detects an error in the control message, it normally discards the message. Since all control messages that are sent by the IDU are responded to by the ODU, the IDU detects the failure to receive a response message via a timeout.

The IDU, when acting as initiator, sends control messages and then waits for message responses. If the IDU doesn't receive any response messages after, for example, two (2) milliseconds, it resends the control message again. If it doesn't receive any response messages after sending several control messages in a row, the IDU takes appropriate corrective action.

4. Control of ODU Components

Table 30 summarizes the components that may be controlled in the ODU by the IDU, their characteristics and the number of bits required to set/read their values.

TABLE 30

ODU Elements Controllable from IDU

| Component | Description | Dynamic Range/Bits |
|---|---|---|
| VVA for Cable Comp (210) | 140 MHz VVA used to compensate for cable loss from the IDU. | 0 to −30.5 dB. Controlled via 8 bit word. VVA is controlled in 0.5 dB steps achievable through most of the range of the VVA. |
| Tx IF2 VVA (234) | S-band VVA used to adjust transmit power of the S band frequency. | 0 to −30 dB. Controlled via 7 bit word in 0.5 dB steps. Used in conjunction with Tx RF VVA (264). |
| Tx RF VVA (264) | MM wave band VVA used to adjust transmit power. | 0 to −30 dB. Controlled via 8 bit word in 0.5 dB steps achievable. Used in conjunction with Tx IF2 VVA (234). |
| Rx IF1 VVA (300) | 140 MHz VVA used to adjust receive attenuation prior to transmission along the cable. Used for Automatic Gain Control (AGC). | 0 to −32 dB. Controlled via 8 bit word. Used in conjunction with Rx IF2 VVA (292) and Rx RF VVA per (280). |
| Rx IF2 VVA (292) | S-band VVA used to adjust receive attenuation. Used for such purposes as AGC. | −1 to −27 dB. Controlled via 8 bit word. Used in conjunction with Rx IF1 VVA (300) and Rx RF VVA (280). |
| Rx RF VVA (280) | MM wave band VVA used to adjust receive attenuation, for such purposes as AGC. | 0 to −24 dB. Controlled via 8 bit word. Used in conjunction with Rx IF1 VVA (300) and Rx IF2 VVA (292). |
| Syn Freq (220) | Synthesizer frequency to be used. | 34 possibilities space 25 MHz apart. |
| Syn Ref (308) | Starting point for frequency mapping. This parameter is dependant upon the Syn Ref Parameter. | 0 to 23.75 MHz in 1.25 MHz steps. |
| Enable/Disable PA (268) | Enables or disables the Power Amplifier, allowing transmission to the ODU with out transmission over the air. (Disable causes the | Enabled means use 40 MHz switching signal. Disable means no transmission regardless of state of 40 MHz switching signal. |

TABLE 30-continued

ODU Elements Controllable from IDU

| Component | Description | Dynamic Range/Bits |
|---|---|---|
| | 40 MHz switching signal to be ignored.) Typically used only in test modes. May be necessary during cable loss compensation. | |

Table 31 summarizes the response messages that can be sent from the ODU to the IDU. The bits used to control/read items are not necessarily what will appear in the user data making up the protocol.

TABLE 31

Response Messages

| Response Data | Description | Dynamic Range/Bits |
|---|---|---|
| Rx IF1 Detector (304) | 140 MHz detector located at the output of ODU to cable. This detector can be used to bring this to 4 dBm. | Approximately −11 to 12 dB. Expressed as 8 bit word. |
| Rx IF2 Detector (294) or Output Power Detector (not shown) | S band detector. Can be used to measure Tx power on the Rx path during transmission. Can also be used to determine transmitter saturation points. Optionally the absolute output power at the PA in dBm. | |
| Tx IF1 Detector (212) | 140 MHz detector at cable input to the ODU. Used for cable compensation. | Approximately −4 to −26 dB. Expressed as 8 bit word. |
| Tx IF2 Detector (230) | S band detector. Can be used to determine transmitter saturation points. | |
| Temperature | Temperature detector. | −35 to 85° C. |
| Ref PLL Lock | Lock detect signal from the 100 MHz reference clock. The synthesizer lock time is 200 msec. | High = fail. |
| Syn Lock | Lock detect signal from the channel selection synthesizer. The synthesizer lock time is 1.5 msec. | High = fail. |
| 2.7 GHz Detect | Detects failure of the 2.7 GHz local multiplier. | High = fail. |

C. Initialization of the System

1. Overview

Figure 6:
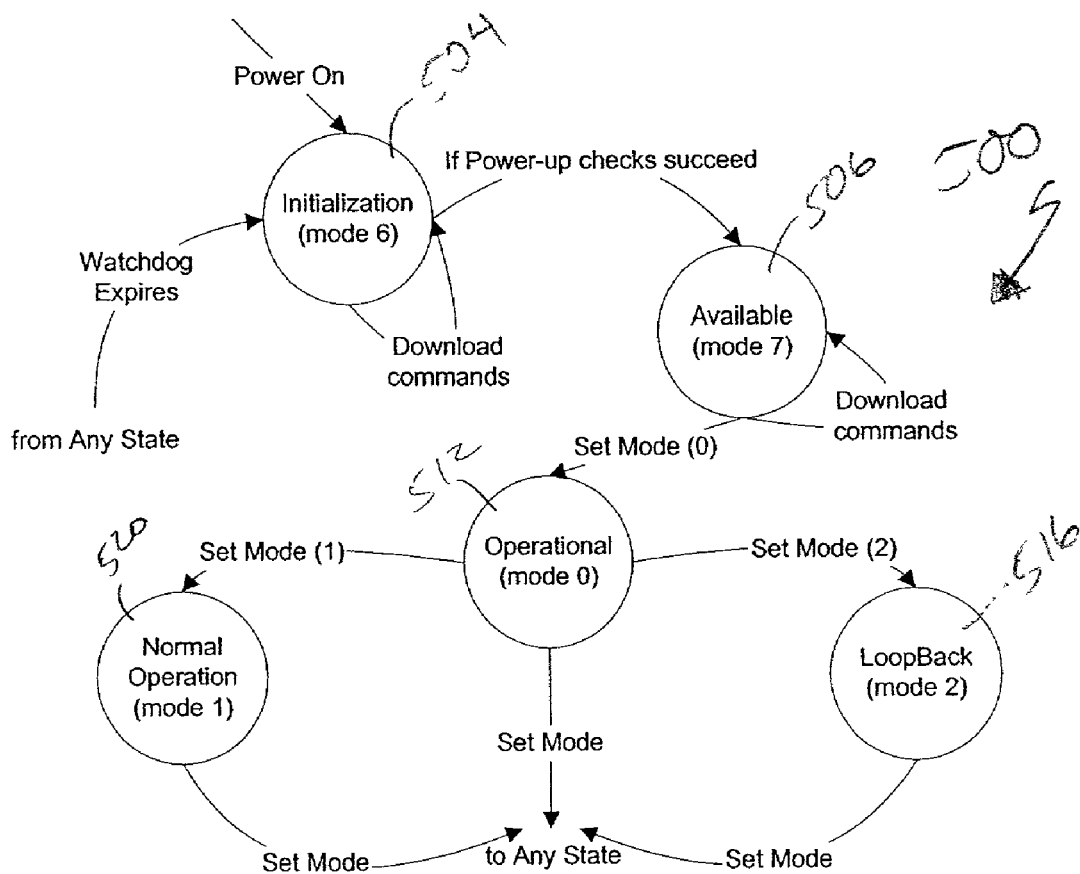
FIG. 6 is a state diagram of one embodiment of the initialization process within an Outdoor unit.

Referring now to FIG. 6, a software state diagram 500 showing the possible modes in which the ODU may operate is illustrated. The initialization process 500 of the Micro Controller in the ODU includes:

Initialization of all I/Os (clock generator, SCI, SPI, A/D etc.)

Reset the local oscillator to inhibit any transmission before being tuned

Determine if the memory partitions for operational software, calibration tables and configuration parameters are valid Determine if memory partitions contents are mutually compatible Establish communications with a master IDU.

On a power-on, or when a watchdog timer expires, the ODU resets and enters a preliminary checkout phase. This phase is explained more completely with reference to FIG. 7. Briefly, all peripherals are reset to a benign state and the ODU places itself in Mode 6 (504). The ODU then automatically attempts to transition itself to Mode 7 (506). This transition entails performing a CRC test on all memory partitions in the ODU to verify that the flash memory is correct and consistent. If it is correct, the initialization procedure in each partition is invoked. This verifies that the content of the memory partition is compatible with the content of any other memory partitions on which it depends. If all memory partitions report compatibility the boot code transition is successful and the system moves to Mode 7, otherwise it remains in Mode 6.

If the process 501 moves to Mode 7, a set_mode command is given by the micro controller and the system initiates normal operation by transitioning the ODU to Mode 0 (512). From Initialization Mode 6, the only valid transition to Mode 0 is through Mode 7, which requires all the previous system tests be successful.

Note that in the State Diagram in FIG. 6, download commands are valid in both Mode 6 and Mode 7 so on power-up, new software can always be downloaded to the ODU even if all memory partitions are invalid.

While in Mode 0, the process 501 can also transition to a loopback Mode 2 (516) and to a normal operational Mode 1 (520). These other Modes are discussed more completely in reference to FIG. 10 below.

2. Preliminary Checkout (Mode 6)

Figure 7:
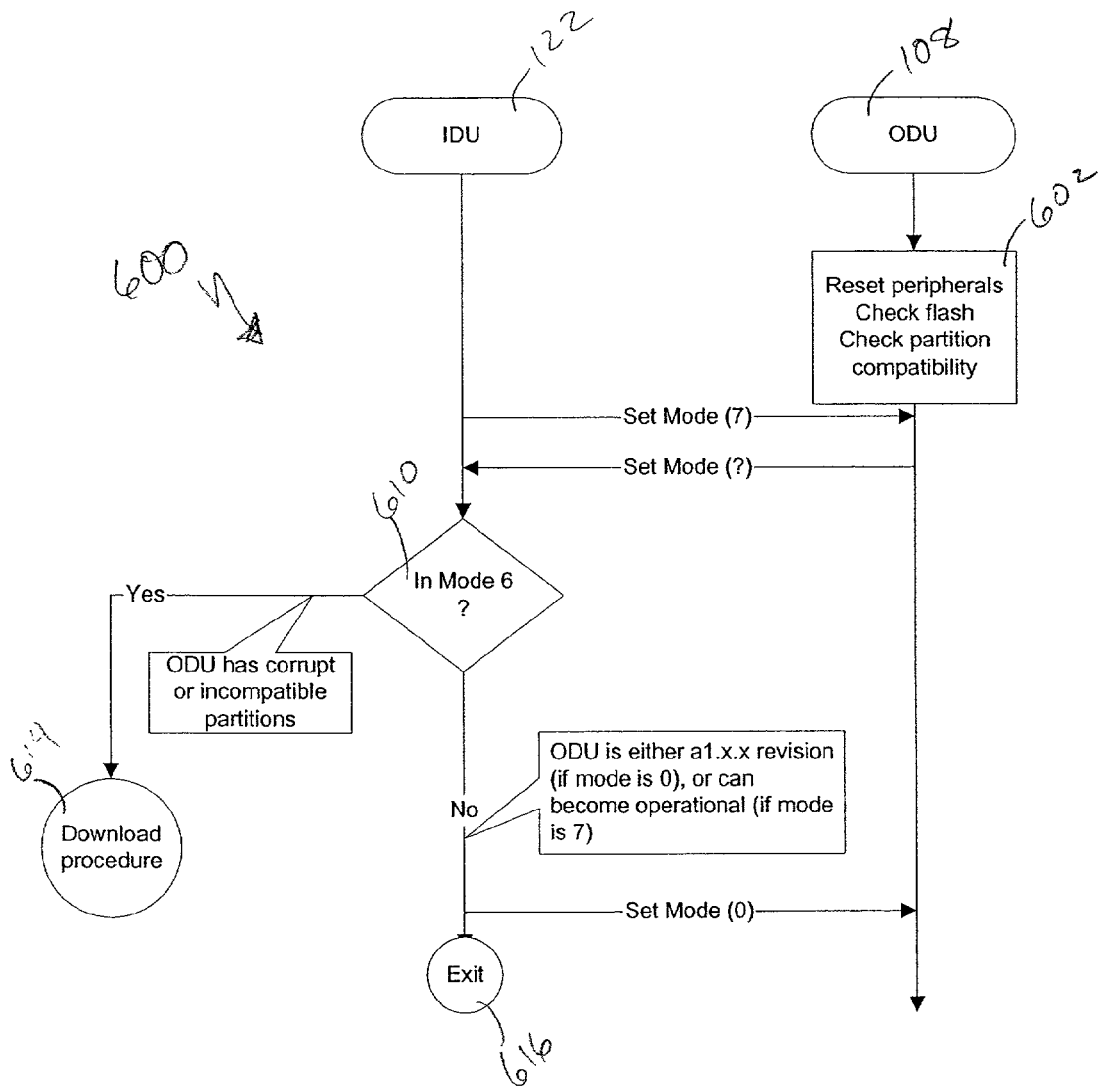
FIG. 7 is a flow diagram of one embodiment of a preliminary checkout process undertaken in the Outdoor unit.

FIG. 7 illustrates the flow of the first interactions between the IDU 122 and ODU 108. A preliminary checkout process 600 begins with the ODU 108 resetting its peripherals, checking its flash memory, and checking its memory partition compatibility at a state 602.

Once this is complete, the IDU 122 sends a SET_MODE (7) command message that attempts to transition the ODU from the checkout mode 6 into Mode 7. The ODU responds with a response message indicating its current mode. A determination of the ODU's current mode is then made by the IDU 122 at a decision state 610. If a determination is made that the ODU is still in Mode 6, and did not transition to Mode 7, the checkout process 600 moves to a state 614 to begin downloading new software to the ODU in an attempt to help the ODU transition to Mode 7.

However, if a determination was made at the decision state 610 that the ODU was not still in Mode 6, the IDU then issues a SET_MODE (0) control message to move the ODU into its operational mode (0). The checkout process 600 then terminates at an end state 616.

When the IDU issues the SET_MODE (0) command, it learns several pieces of information from the response message. If there's no response it indicates that either the connection to the ODU is faulty or that the ODU is broken in some way. If there is a response, then the state returned in the response message indicates which of the three possible states the ODU is now in. From the response message the IDU can determine if it must perform some remedial action on the ODU (see the download procedure described later), or if it can begin operation.

3. Handshaking Process

Figure 8:
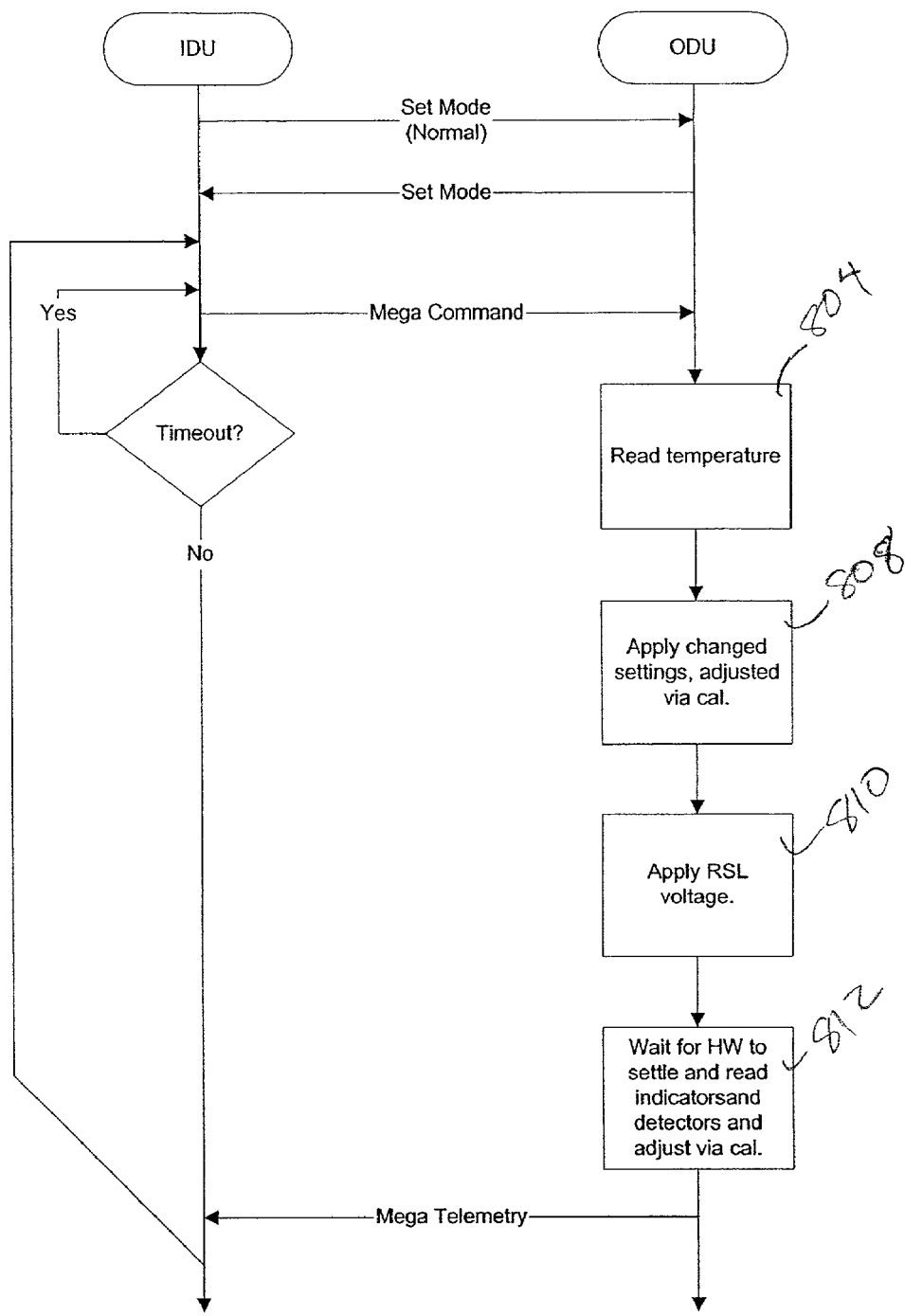
FIG. 8 is a flow diagram of one embodiment of a handshaking process between the Indoor unit and the Outdoor unit.

After the initialization processes of FIG. 7 are completed (identical for Base Station and CPE), a handshake process 800 begins, as shown in FIG. 8. In the handshake process 800, the Micro Controller in the ODU waits for the first message from the IDU. Because of the complexity of the software in the IDU (whether CPE or base station), the ODU normally finishes initialization before the IDU.

The IDU then issues a SET_MODE (1) command message to transition the ODU into Normal Operational Mode 1. This transition results in the ODU performing the following functions:

Control the following components:
 1. Set Receive (Rx) VVAs attenuation to minimum.
 2. Set Transmit (Tx) VVAs attenuation to maximum.
 3. Set reference frequency (LMX2301) to 100 MHz.
 4. Disable the Power Amplifier
Measure test points.

Once complete, the process 800 then loops continuously, receiving response messages from the ODU and performing the actions dictated by the control messages from the IDU. The most typical action in this process in the ODU is:

The ODU receives a MEGA command from the IDU with instructions to alter the values of the VVAs or Frequencies in the Frequency synthesizers and:
 1. Reads the temperature (State 804).
 2. Adjusts the settings received in the MEGA control message for temperature, if necessary and applies the new values (State 808).
 3. Calculates and applies the RSL voltage setting (State 810).
 4. Reads detector values and adjusts values for temperature via the calibration tables (State 812).
 5. Reads the 3 lock/detect indicators.
 6. Builds and transmits a mega response message.

4. Reading Detector Values

Figure 9:
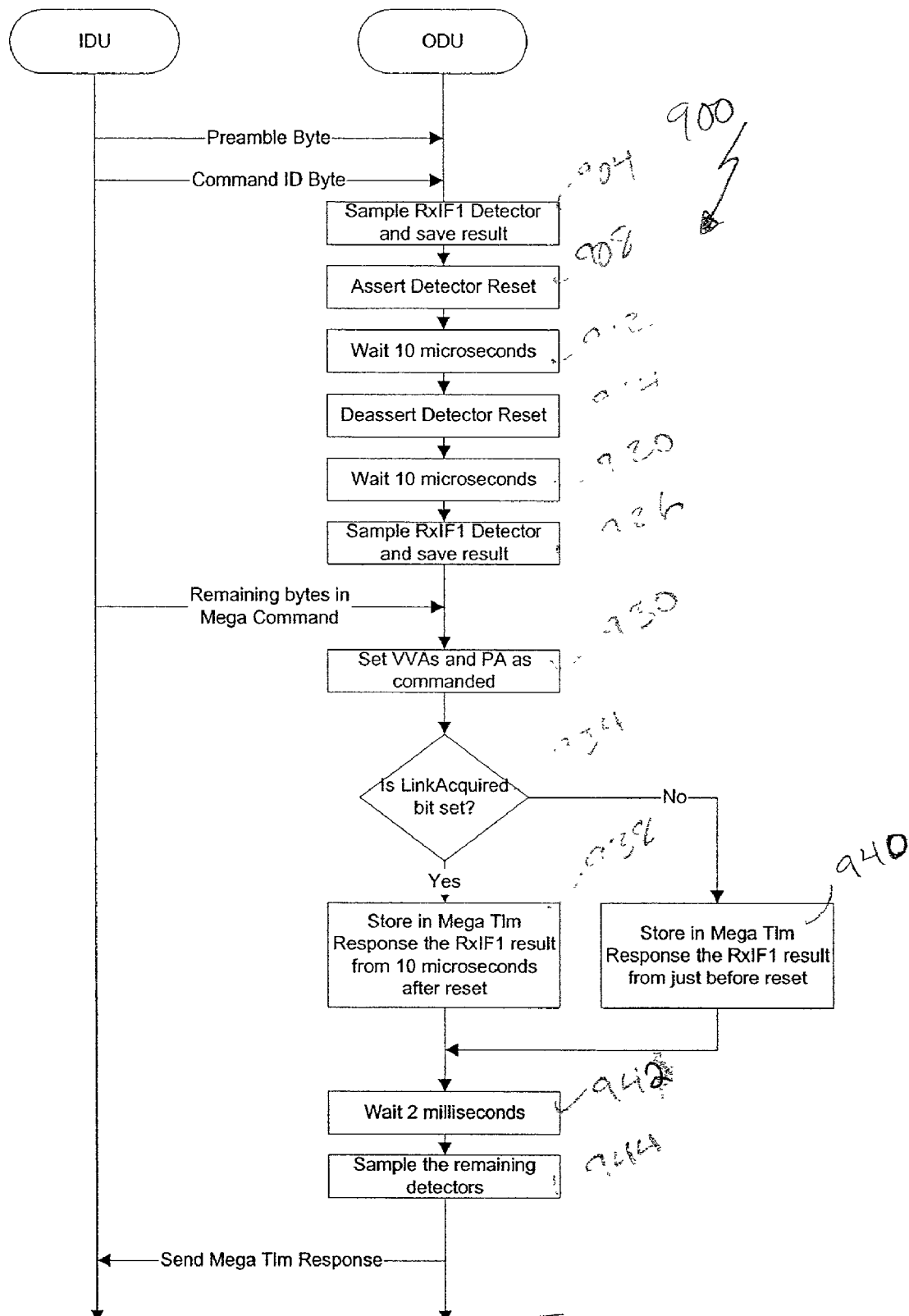
FIG. 9 is a flow diagram of one embodiment of a timing measurement of a detector process undertaken in the Outdoor unit.

As shown in FIG. 9, a process 900 of reading ODU detector values is illustrated. The process 900 begins when the ODU measures the output from the RxIF1 detector 304 (FIG. 4) at a precise instant (state 904) in order to send this value in the Mega Response Message. Every time the ODU receives the byte immediately following the preamble byte, it reads the detector 304 at the state 904 and saves the result. Then it holds the detector in reset for 10 microseconds at a state 908. The process 900 then de-asserts the reset signal at a state 914 and waits 10 more microseconds at a state 920. The process 900 then samples the RxIF1 detector 304 again at a state 926 and saves the result. The VVAs and Power Amplifier are then set at a state 930 as commanded by the MEGA control message.

A determination is then made at a decision state 934 whether or not the LinkAcquired bit was set in the Mega Control message. If the LinkAcquired bit was set, the ODU reports the measurement taken immediately after the detector reset at a state 938. However, if the LinkAcquired bit was zero, the ODU reports the measurement taken immediately before the detector reset at a state 940.

The process 900 then waits two milliseconds at a state 942 and proceeds to sample any remaining detectors in the ODU at a state 944. The Mega response message is then sent from the ODU to the IDU.

5. Loopback Mode

Figure 10:
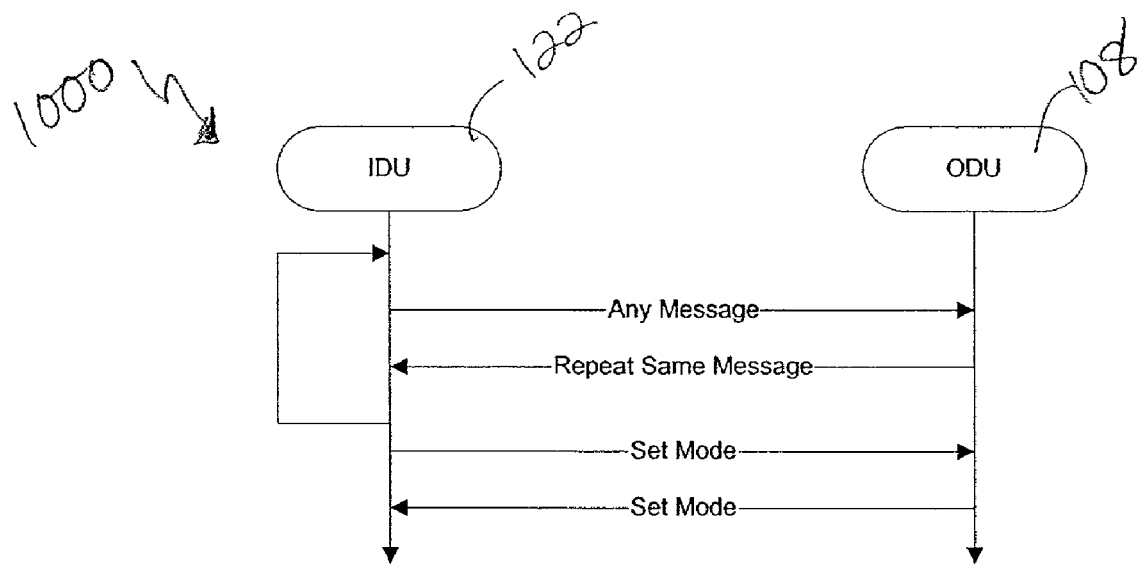
FIG. 10 is a flow diagram of one embodiment of a loopback process undertaken in the Outdoor unit.

In the loopback mode process 1000 illustrated in FIG. 10, the ODU 108 simply repeats back to the IDU 122 whatever message it has received. It leaves the loopback mode when it receives the set mode control message to transition to a different mode. No other work is performed during loopback mode—no reading of control messages or setting of control values. The control messages sent to the ODU by the IDU during loopback mode preferably have a preamble, a CRC, and at most 14 additional bytes. Other than "set_mode" message data which must follow the format described above, the messages sent during loopback mode may be composed of any byte pattern.

6. Customer Premises Equipment

Figure 11:
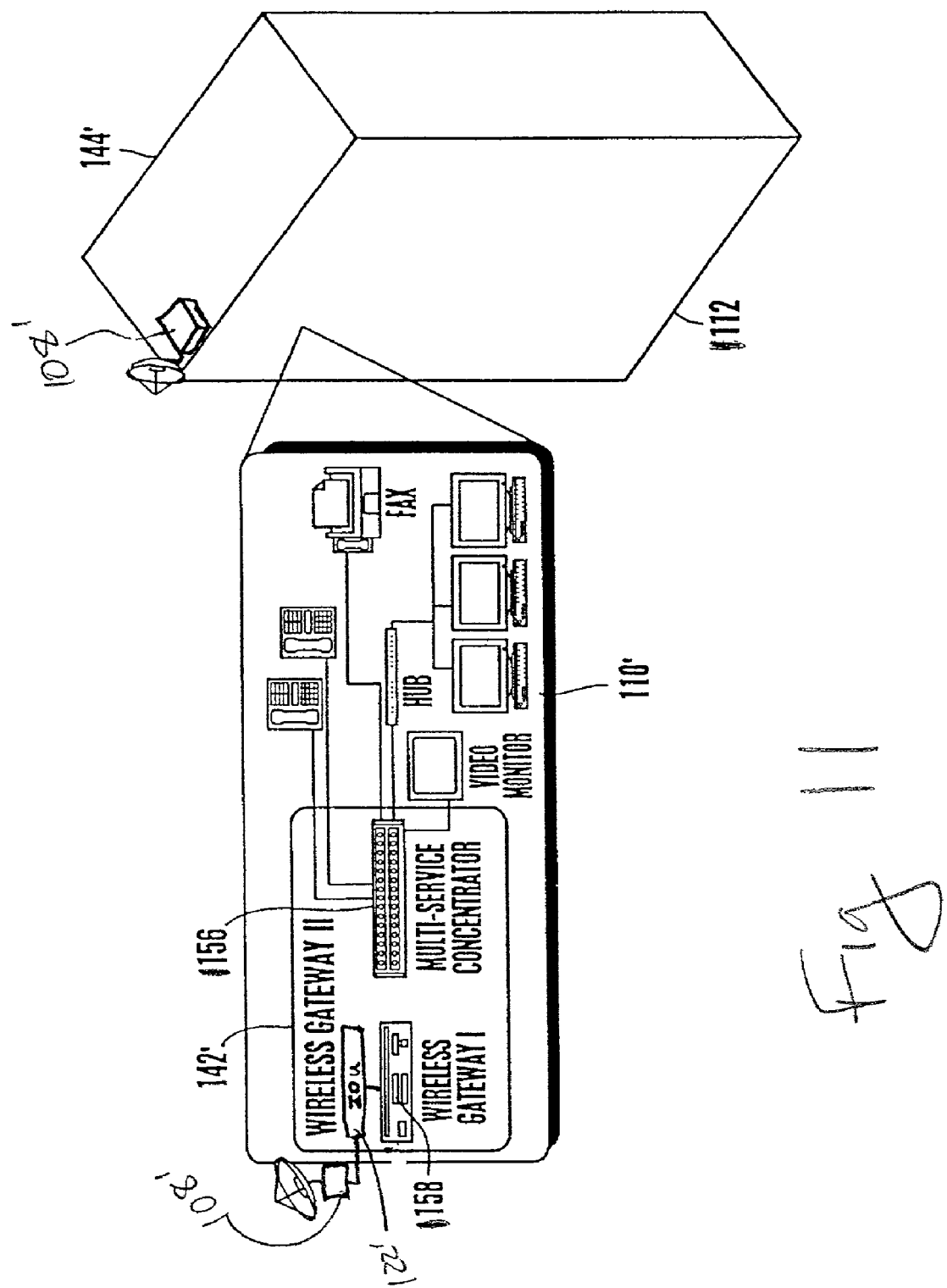
FIG. 11 is a block diagram of a commercial customer site that includes customer premises equipment.
Figure 12:
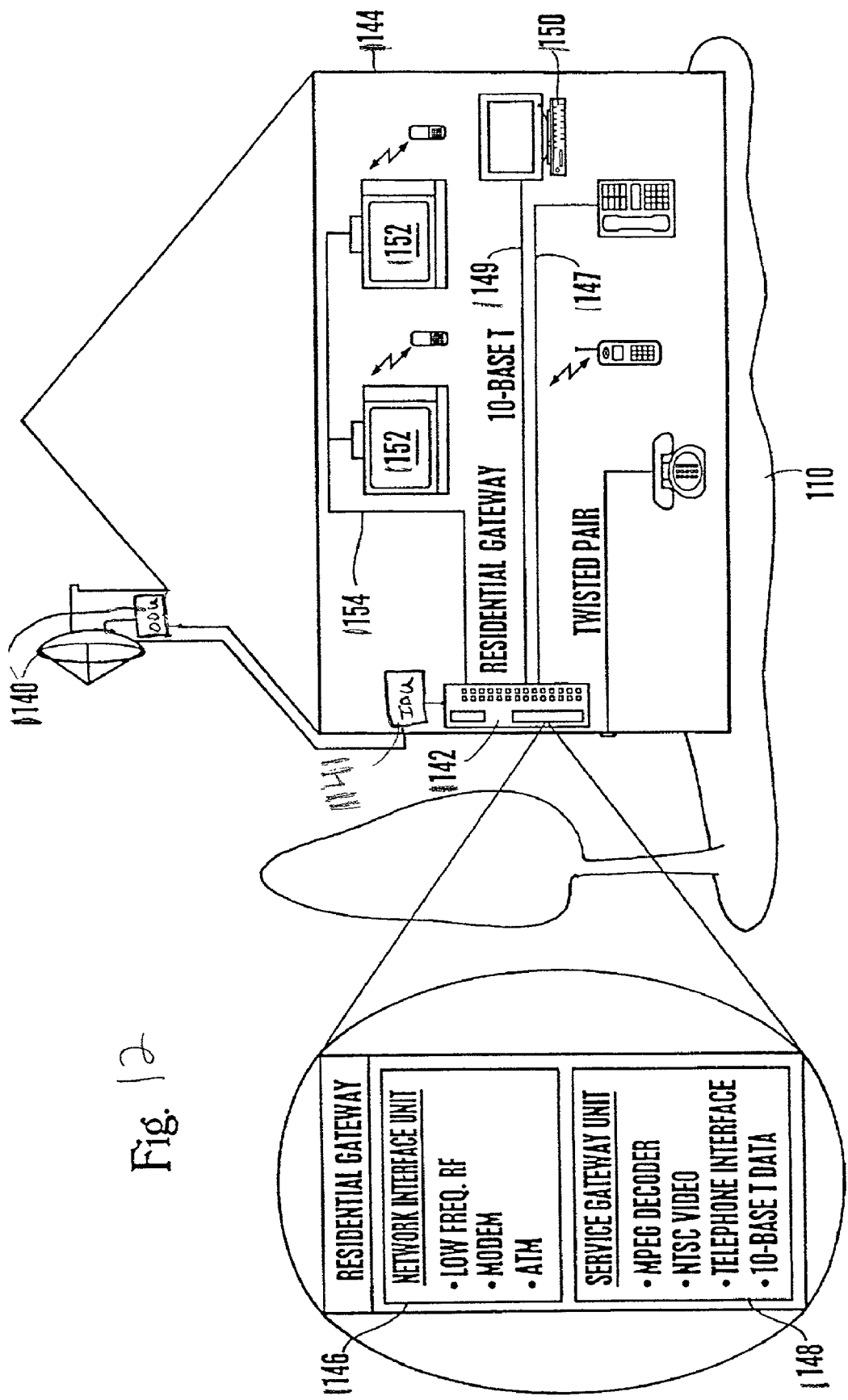
FIG. 12 is a block diagram of a residential customer site that includes customer premises equipment.

Although the previous discussion has focused on IDUs and ODUs that are installed as part of a base station, these devices are similarly installed within each customer site for receiving and transmitting wireless data. As illustrated FIGS. 11 and 12 are block diagrams of the customer premises equipment (CPE) 110 shown in FIG. 1. As described above, the subscribers of the wireless communication system contemplated for use with the present invention may be either residential or business customers. FIG. 12 is a block diagram of a preferred residential CPE 110. FIG. 11 is a block diagram of a preferred business CPE 110.

As shown in FIG. 12, the residential CPE 110 preferably includes an ODU 1140, IDU 1141 and a residential wireless gateway apparatus 1142. The residential gateway 1142 is preferably installed on a side of the residence 1144. The residential gateway 1142 preferably includes a network interface unit (NIU) 1146 and a service gateway unit 1148. The NIU 1146 performs the functions necessary to allow the residential user to communicate with the wireless communication system, such as performing low frequency RF communication, modem and ATM functions.

The NIU 1146 performs the necessary communication interface functions including airlink and protocol interface functions to allow the residential user access to the network. The service gateway unit 1148 allows the residential user to gain access to the services provided over the communications system.

For example, as shown in FIG. 12, the service gateway unit 1148 preferably includes an MPEG decoder, NTSC video interface, telephone interface and 10-baseT data interface. The residential gateway 1142 interfaces to the various service access points within the residence 1144. The residential gateway 1142 contains the necessary hardware and software for interfacing to the radio communications airlink and for driving various services into the residence 1144. In addition, by interfacing with the telephone wiring 1147 within the residence 1144, the residential gateway 1142 is capable of providing a variety of telephone services to the residence 1144.

Similarly, by interfacing with copper or co-axial wiring 1149 within the residence 1144, the residential gateway 1142 is capable of providing 10-baseT and other data services to equipment 1150 (such as a personal computer depicted in FIG. 12) within the residence 1144. Finally, the residential gateway 1142 can also provide broadcast video and data-centric television services to a plurality of television systems 1152 by interfacing with standard cable television co-axial cabling 1154 in the residence 1144. The residential gateway 1142 is designed in a modular fashion to service multiple data, telephone, and video lines. Thus, a single residential gateway 1142 is sufficiently flexible to accommodate the communication needs of any residential customer.

FIG. 11 is a block diagram of the preferred business CPE 110' of FIG. 1. The preferred business CPE 110' is designed to provision and provide services to a small business customer site 1112. As shown in FIG. 11, the business CPE 110' preferably includes an ODU 108' and IDU 122'. The CPE 110' also includes a business wireless gateway apparatus 142'. The ODU 108' is preferably affixed to a business site building 144' while the business gateway 142' is preferably installed in a wiring closet within the business site building 144'.

The communication interfaces of the business gateway 142' are similar to those of the residential gateway 1142 (FIG. 12). However, the service interfaces of the business gateway 142' differ from those of the residential gateway 1142. The business gateway 142' preferably includes interfaces capable of driving voice and data services typically used by small business customers. These include integrated services digital network (ISDN), local area network (LAN), PBX switching and other standard voice and data services.

As shown in FIG. 11, a "two-box" solution is presently contemplated for implementing the business gateway 142'. An "off-the-shelf" multi-service concentrator 1156 can be used to provide the business user services and to convert the outgoing data into a single transport stream. The business gateway 142' also includes a wireless gateway apparatus 1158 which contains the necessary hardware and software for interfacing to the IDU and for driving various services into the business site building 144'.

Alternatively, the wireless functionality provided by the business gateway 142' can be integrated into the multi-service concentrator 1156 in order to reduce costs and provide a more integrated business gateway solution. Different types of multi-service concentrators 1156 can be used depending upon the size and needs of the business customer. Thus, a network provider can deploy a cost effective solution with sufficient capabilities to meet the business customer's needs.

Various types of services can be provided to the business customer using the CPE 110' of FIG. 11. For example, by providing standard telephone company interfaces to the business customer, the business CPE 110' gives the customer access to telephone services yet only consumes airlink resources when the telephone services are active. Network providers therefore achieve significant improvements in airlink usage efficiency yet are not required to modify or overhaul conventional interfaces with the business customer's equipment (e.g., no changes need to be made to PBX equipment). In addition, the business gateway 142' can support HSSI router and 10-BaseT data interfaces to a corporate LAN thereby providing convenient Internet and wide area network (WAN) connectivity for the business customer. The business gateway 142' will also enable a network provider to provision "frame-relay" data services at the customer's site. The business gateway 142' can support symmetrical interface speeds of 10 Mbps and higher.

Finally, the CPE 110' facilitates the transmission of various types of video services to the business user. The video services preferably primarily include distance learning and video conferencing. However, in addition, the business CPE 110' can include ISDN BRI interfaces capable of supporting conventional video conferencing equipment. Using these interfaces, the business users will have the option of either viewing or hosting distance learning sessions at the business site building 144'.

D. Programming the ODU

Figure 13:
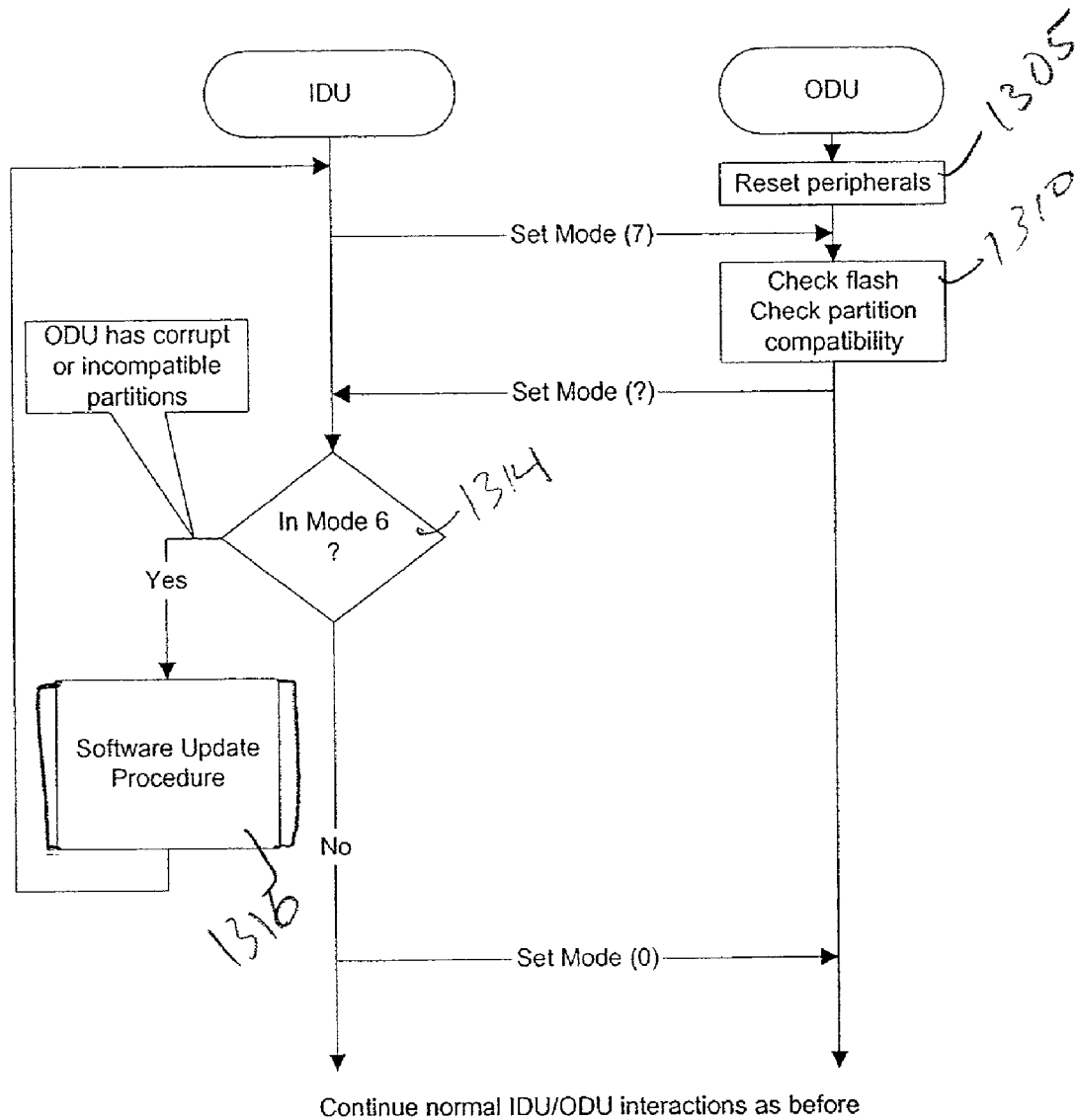
FIG. 13 is a flow diagram of one embodiment of a process for programming an outdoor unit.

In one embodiment, the ODU is programmable across the cable 129. Thus, when a software update for the ODU is necessary, the software can be loaded from the IDU. The software update system is preferably implemented as part of a bootstrap module in the ODU. The bootstrap module manages the following activities of the ODU:—Power-on reset; serial port communication; determination of valid Operational Software; processing of download commands; and programming flash memory. FIG. 13 illustrates the overall behavior of an ODU having an update module.

1. Overview of Programming the ODU

After being powered on, the ODU jumps directly to the bootstrap module where it resets its peripherals to a benign setting at a state 1305 and waits for input from the IDU. This ensures that no errors in downloaded software can prohibit downloading new software.

As shown in FIG. 13, the IDU then sends a control message to the ODU instructing it to enter mode 7. This forces the ODU bootstrap code to validate the code in its flash memory at a state 1310. This validation preferably includes a checksum test of its memory partitions. If the validation function passes, a compatibility function stored in each of the partitions is run to verify that the version resident in the partition is consistent with any other partitions on which it depends. Thus, each individual ODU within the system detects if the combination of partitions it has is allowable without there ever being an inconsistency in either the IDU or ODU. If the process ends successfully, the ODU transitions to mode 7 and transmits a response message back to the IDU. If any of the tests above fail the ODU returns to mode 6 and responds with a failure response message.

When the IDU receives the response from the ODU a determination is made at a decision state 1314 whether the ODU has entered mode 6. Mode 6 indicates that the ODU is able to accept download commands from the IDU but that some problem exists in the ODU's configuration. The software update process is then invoked at a state 1316 to rewrite software to the ODU flash memory and remedy the problem. Until the problem is remedied, the ODU remains in mode 6.

If a determination is made at the decision state 1314 that the ODU has transitioned into mode 7, the initialization process continues normally, and without the need for a new software download. The IDU then sends a control message to the ODU instructing it to enter mode 0 for normal operation.

2. Memory Layout

Figure 14:
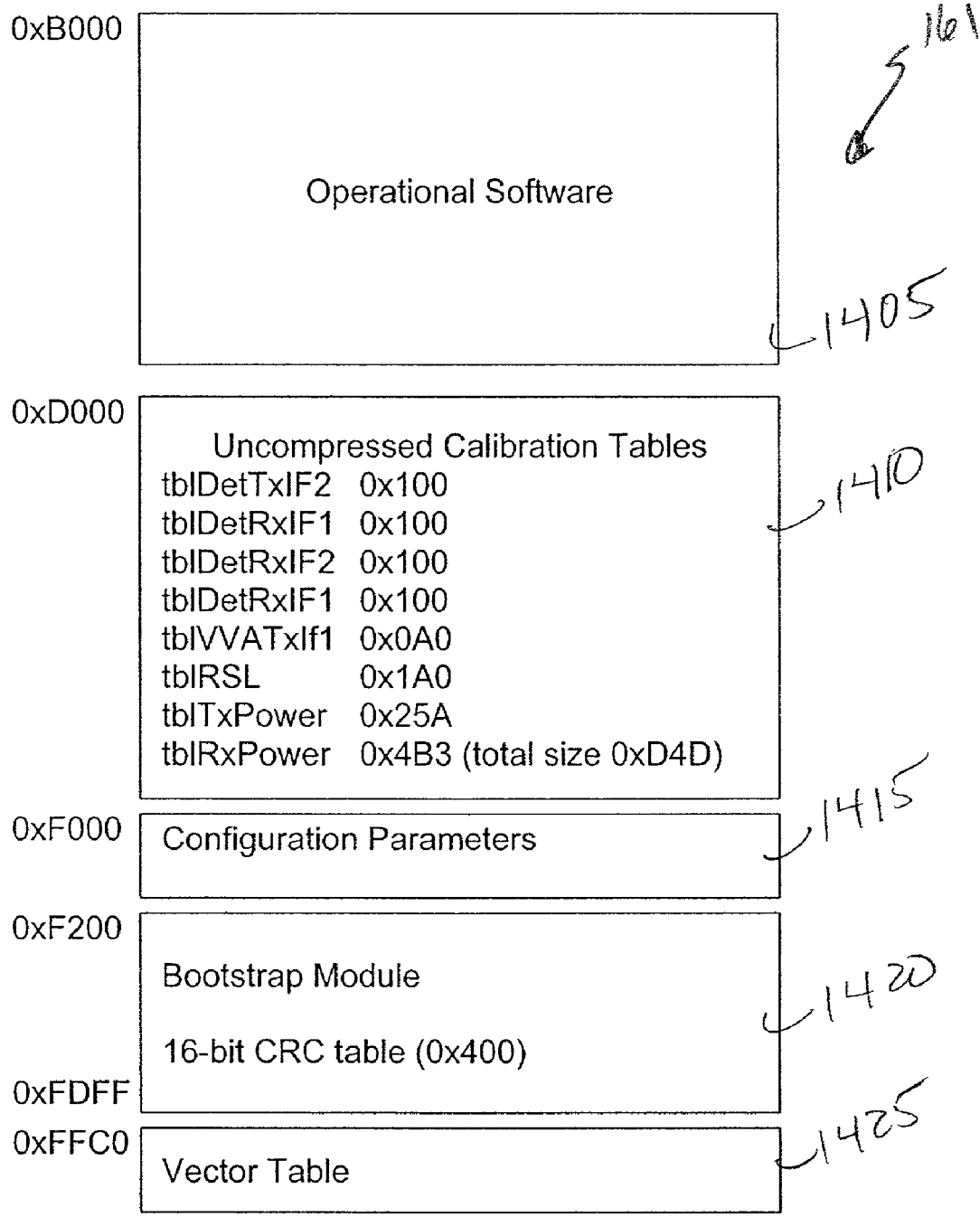
FIG. 14 is a block diagram of one embodiment of memory partitions in an outdoor unit.

To support the software update process, the flash memory 161 (FIG. 4) in the ODU is organized into partitions as illustrated in FIG. 14. Each partition has a specific purpose. There is an Operational Software partition 1405 and Uncompressed Calibration Table partition 1410 and a Configuration Parameters partition 1415. The data in each of these partitions can be dynamically downloaded from the IDU to the ODU. In addition to these partitions, there is a bootstrap partition 1420 and vector table 1425 that are programmed during manufacture not subject to reprogramming in the field. Of course, it should be realized that memory in the ODU could be any type of programmable memory, such as a FLASH memory, a programmable read only memory (PROM), an application specific integrated circuit (ASIC), a programmable array logic (PAL) integrated circuit or a field programmable gate array (FPGA)

3. Software Update Process

Figure 15:
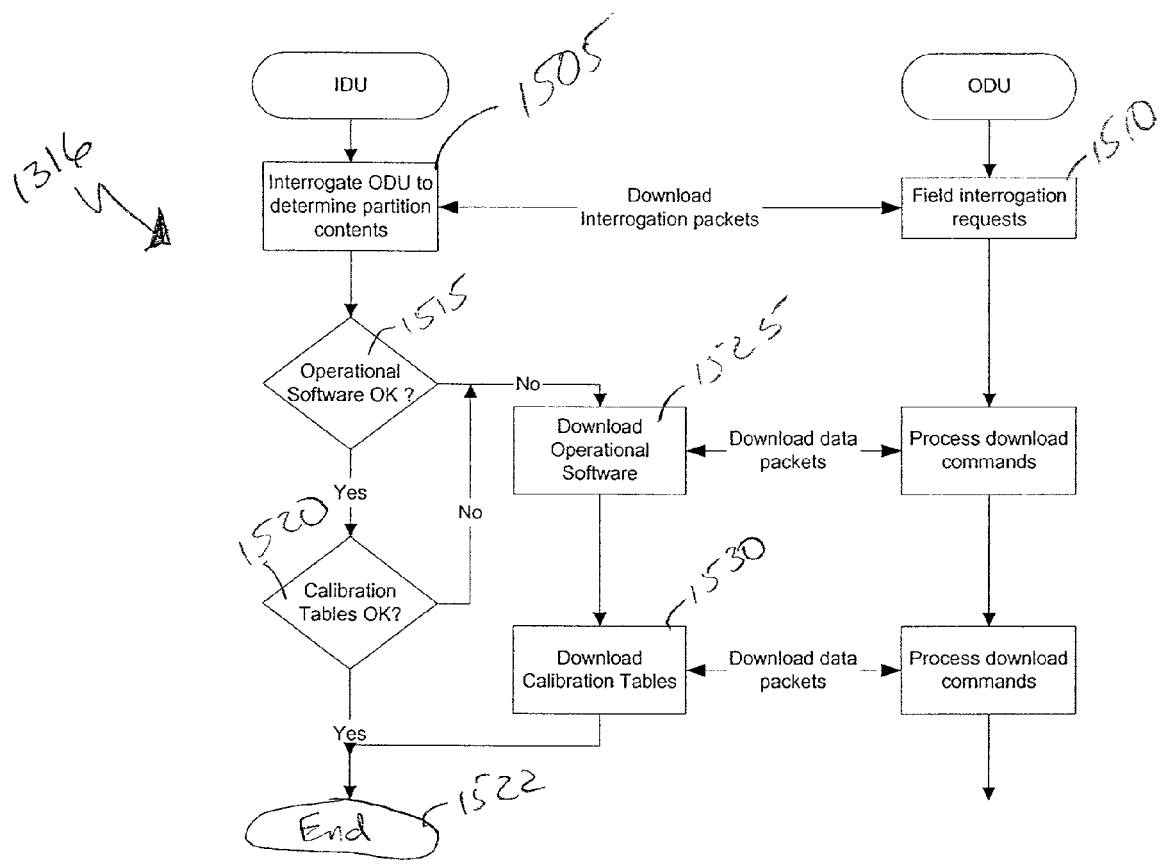
FIG. 15 is a flow diagram of the software update procedure that is part of the process for programming an outdoor unit illustrated in FIG. 13.

Referring to FIG. 15, the software update process 1316 is divided into two sections. In the first section, the IDU gathers information relating to the current content of the ODU memory partitions. Then, if possible, the software update process updates any defective partitions with the software it has available.

As shown in FIG. 15, the process 1316 begins at a state 1505 wherein the IDU interrogates the ODU to determine the contents of its memory partitions. The ODU processes the interrogation requests from the IDU at a state 1510. A determination is then made at a decision state 1515 whether or not the contents of the operational partition 1405 of the ODU match the operational software stored in the IDU. If the contents do match, the process 1316 moves to a decision state 1520 wherein a determination is made whether or not the contents of the calibration table partition 1410 match the calibration tables stored in the IDU. If there is a match, the update process terminates at an end state 1522 since the ODU programming is intact.

However, if the contents of the operational software partition 1405 do not match with the operational software stored in the IDU, the process 1316 moves to a state 1525 wherein a new copy of the operational software, or a necessary portion of the operational software, is downloaded to the ODU. This process is described more completely with reference to FIGS. 16–18 below.

In one embodiment, if the IDU has to download any module it downloads every module it has. This ensures that after the download process is complete, the ODU will contain a consistent set of modules. Thus, after the operational software is downloaded at the state 1525, the process 1316 continues to download the calibration tables at a state 1530. Once the calibration tables are downloaded, the process 1316 terminates at the end state 1522.

It should be realized that if power is lost during the downloading or programming process the ODU might miss some or all of the commands being sent it by the IDU. This will result in an IDU making a number of retries to deliver the command and then abandoning the download process and reporting the ODU as failed.

When power is restored the IDU will determine through the process described above that it must restart the software update process. Accordingly, the downloading and programming step will be repeated.

If successive programming attempts fail, this may indicate a more serious problem with the ODU, the IDU interface or the cable between them.

4. ODU Interrogation

As described above, before the IDU downloads new software to the ODU it determines the current contents of the ODU memory partitions. This is true even when new software is written without regard to current content. This relates to the fact, as described below, that partitions maintain a "write count" indicating the number of times the memory partition has been overwritten. This can be important in embodiments of the invention wherein the ODU memory has a predetermined number of writes before becoming unstable.

As described previously, on startup the IDU interrogates the ODU to determine partition information. This provides both version information and the partition information necessary for properly programming the ODU. During this process, the IDU requests partition information for every partition in the ODU by issuing a Download: Get_Partition_Info command message. The IDU takes a partition number as a parameter. Partitions are numbered 0, 1 and 2 corresponding to the operational partition, calibration partition and configuration partition as described earlier. The ODU then responds with a Download_Ack: Partition_Info_Report response message indicating the content of the requested memory partition.

5. Downloading a Partition

Because of the size and space limitations of the micro controller on the ODU, the download process is closely tied to the physical behavior and characteristics of the processor. In one embodiment, the micro controller is a Motorola MC68HC908GP20 high-performance 8-bit micro controller, and the internal flash memory is programmed in blocks of 64 bytes, called rows. The IDU does a comparison of the row it is about to write with the current contents of the same row in the ODU. If the data at the target ODU row is the same as the data about to be written, the IDU does not write the row. This prevents the IDU from wasting write cycles by writing the same data to a row in the ODU memory partition. However, if the IDU row data that is about to be written differs from the target row data currently stored in the ODU, the IDU will instruct the ODU to write that row to the ODU.

Moreover, because in this embodiment the micro controller contains only 512 bytes of RAM for all variables, stack and buffers, the protocol between ODU and IDU limits the size of a packet to 16 bytes. Of course, this invention is not limited to this exemplary processor, and other similar processors are anticipated to function in a similar manner.

In this embodiment, the basic download packet control message from the IDU to the ODU contains 8 data bytes and the offset within a RAM buffer where the bytes are to be placed within the flash memory partition. After 64 bytes (one row) have been sent across the cable 129, the IDU instructs the ODU to write data to the target row within the flash memory. The ODU responds to each command message so the IDU can confirm that data has been written successfully.

The programming process repeats until the every row and partition that needs reprogramming in the ODU memory has been programmed. From the ODU point of view there is no difference in programming the Operational Software, the Calibration Tables, or the Hardware Parameters.

It should be noted that the bootstrap partition cannot be programmed using this method for two reasons. First the bootstrap module is the code being executed to write to flash, so the program would be effectively overwriting itself. Second, any failures during the write process would potentially leave partially written bootstrap instructions which would lead to problems the next time the ODU was booted.

6. Calibration Tables

In one embodiment, the calibration tables are embedded within the programmed software in the IDU and are formatted in a compressed manner. These tables are then uncompressed by the IDU and stored to the "Calibration Tables" partition within the ODU memory block. The linkage between Operational Software and Calibration Tables is accomplished procedurally through a jump table in the partition header, as described below. This allows for the flexibility of adding or moving tables in the module without having to revise otherwise unchanged Operational Software.

The partitions for Operational Software and Calibration Tables are preferably sized equally so that if necessary in the future their positions can be transposed.

7. Modifying Calibration and/or Hardware Parameters

One process for modifying any of calibration or hardware parameters maintained in the ODU is described below. The process utilizes the fact that when the operational software is running the ROW buffer is used to maintain the current values of both sets of parameters.

Once an initial image of the calibration and hardware parameters has been retrieved, any and all parameters can be set as often as necessary. When satisfactory values have been achieved a single save_to_flash command from the IDU causes all the current settings of both calibration and hardware parameters to be saved to the flash memory in the ODU.

8. Modifying ID Strings

In addition, the described below is process for modifying any of the ID strings maintained in the ODU. As is apparent, the ODU itself does not "know" anything about the nature or content of the string. The ODU only understands how to retrieve data from memory and write it back again. Since the process retrieves the entire string from the ODU, the string may be divided into several segments. This allows, for example, the serial number, date of manufacture, time and result of testing to be added to the string as necessary.

9. Partition Headers

At the beginning of each partition is a partition header. The table below illustrates the content and layout of the header. It is designed to fulfill three capabilities. It allows the bootstrap module to recognize properly downloaded partitions, and their revision levels; it provides the bootstrap module with the information it needs to report partition contents to the IDU; and it provides a jump table to be used as calling mechanism to allow modules to call functions in one another without having to know where in the module the function exists.

TABLE 32

Layout of Headers

| Name | Size | Meaning |
|---|---|---|
| Partition_Write_Count | 2 | The number of times the partition has been overwritten (GP-20 range 0 . . . 99) GP-32 range 0 . . . 9999 |
| Partition Write_Count_CRC | 2 | A CRC-16 value for Partition_Write_Count |
| Module_CRC | 2 | A CRC-16 value for the module calculated from Module_Length for Module_Length bytes |
| Module_Length | 2 | The number of bytes in the module |
| Partition_Header_Layout | 1 | The format of the partition header (1) |
| Module_type | 1 | The kind of module this is = Partition empty 0xFF = Partition empty 'O' = ODU operational software 'C' = Calibration tables 'B' = Bootstrap code 'H' = Hardware Parameters others = future use |
| Module_Version_Number | 1 | The version number of this module |
| Filler | 21 | Empty space to ensure the jump table starts at 32 |
| Jump_Table_Layout | 1 | The format of the jump table (1) |
| Partition_Content_Address | 2 | The address of the first byte after the partition header |
| Module_Entry_Point | 3 | First byte is a JMP instruction, next two are the Address of the first instruction in the module |
| Jump_Table_Entries | 3*N | Successive jump table entries containing JMP <function address> |

The jump table entries provide a means for different modules to call each other without creating link-time dependencies. The most basic dependency in a function call is the address of the function being called. The jump table provides a constant known address (the offset from the start of the partition) where the caller can always call and be assured that the callee will be invoked. Within the module the callee can move from revision to revision with impunity so long as the offset in the jump table does not change.

As one example: The bootstrap module exports the function RxSci—which receives bytes on the SCI port, assembles them into packets and reports when a complete packet as been received. The jump table provides a way for the Operational Software to call the RxSci function in the bootstrap module without knowing precisely where the code resides—all it must know is the jump table entry number and the parameters required for the function call. This allows flexible development of modules without having to tie specific addresses to specific functions.

10. The Bootstrap Module

This section describes in detail how the bootstrap code operates, and interacts with the partitions and their content described earlier. This is done by walking through the startup process from the moment power is applied.

For the ODU to operate correctly, it is programmed during manufacture with at least the bootstrap code and a Download Module. When power is applied the processor jumps to the address specified in reset vector at $FFFE, and $FFFF. The reset vector points to the first executable instruction in the Bootstrap Module. Below is some example C pseudo-code illustrating the bootstrap code's behavior.

The code determines which partitions are valid by performing a CRC check on each partition according to its header information. If the CRC is correct, it enters its address in the module base table in RAM. If a module is absent its entry contains 0. Once all partitions have been checked, the bootstrap module waits for commands from the IDU.

Exemplary C pseudo-code for the process is shown below:

```
        typedef unsigned int *address;
            typedef unsigned int uint16;
#    define    EMPTY_PARTITION 0
#    define    ORPERATIONAL_SOFTWARE 'O'
#    define    CALIBRATION_TABLE S 'C'
#    define    BOOTSTRAP_CODE 'B'
#    define    HARDWARE _PARAMETERS 'H'
        typedef struct {
            uint8   instruction; /* Normally this is a JMP, ho
the */
                                                    /* entry is emp
fine!   */
            uint16   address;
        } jump_table_entry_t;
        typedef struct {
            uint16                        crc_16;
            uint8                         header_format;
            uint8                         write_count;
            uint16                        length_in_bytes;
            char                          type;
            uint8                         version;
            uint8                         filler [24];
            uint8                         n_jump_table_entries;
            jump_table_entry_t jump_table [1];
                                                    /* All partitions h
entry */
                                                    /* some may have m
*/
        } ODU_partition_header_t;
int ODU_partition_is_valid ( ODU_partition_header_t
*partition_ptr)
{
        uint16   crc16_state = 0;
        uint16   crc16_temp;
        int16    crc16_bytes_remaining = partition_ptr->length_in_bytes_size
>crc_16);
        uint8    *crc16_ptr = ( ( uint8 *) part size
>crc_16);
        while ( crc16_bytes _remaining-- > 0) {
            crc16_temp = crc16_table [
                                                    ( ( crc16_state    ^
0x00ff)];
            crc16_state = ( crc16_state >> 8) ^ crc16_temp;
        };
        return ( crc16_state == partition_ptr->crc)  ?  0  :  1;
}
        typedef struct {
            void    *start_address;
            int     maximum_size;
        } ODU_partition_table_t;
#    define    MAX_PARTITIONS ( 5)
        const    ODU_partition_table_t ODU_partitions [MAX_PARTITIONS] =
{
                            /* Operational Software */  {0xB000, 0x2000},
                            /* Calibration Tables */    {0xE000, 0x2000},
                            /* HW Params */             {0xF000, 0x0200},
                            /* Bootstrap */             {0xF200, 0x0BFF}};
ODU_partition_t *find_partition ( char type) {
        ODU_partition_header_t *p;
        ODU_partition_header_t *best_partition = 0;
        int                                          best_version =
        /*
        ** Loop through all the available partitions looking for
partition
        ** containing a module matching "type". Every time we
one we
            ** check to see if its more recent than the one we hav
```

```
it is
    ** we record it, otherwise go on to the next.
    */
    for ( int i = 0; i < MAX_PARTITIONS; i++) {
        p = ( ODU_partition_header_t *) ODU_partitions
[i].start_address;
            if   ( ( p->type == type) &&
                    ( p->version > best_version) &&
                    ( ODU_partition_is_valid (&( ODU_partitions [i]))
                best_version =    p->version;
                best_partition =  p;
            }
        };
        return best_partition;
}
int ODU_boostrap_main    ( void)   {
    /*
    ** Step 1.
    ** Find the base address of each type of partition and
the
    ** entry in the module base table. Each entry has a
name,
    ** so code elsewhere can use the name when generating
references
    */
    BOOT_BASE =           find_partition ( BOOTSTRAP_CODE );
    HARDWARE _BASE =      find_partition ( HARDWARE _PARAMETER
    CALIBRATION_BASE =    find_partition ( CALIBRATION_TABLE S);
    OPERATIONAL_BASE =    find_partition ( OPERATIONAL_SOFTWARE );
    /*
    ** Step 2.
    ** Now that we've built the module base table, poll the
port as
    ** the current software does.
    */
    while ( TRUE ) {
        if ( valid_sci_command_recieved ( )) {
            sci_packet_handler_entry ( );
        } /* end if */;
    } /* end while */;
    }
}
```

The function ODU_boostrap_main represents the principle actions of the bootstrap module. In the first step, the code determines the base addresses for each of the partitions it expects should exist in the ODU. At the next step it enters a polling loop modeling the loop in the current ODU software. The function valid_sci_command_recieved, returns TRUE when a whole packet has been received through the SCI port, while the function sci_packet_handler_entry calls the function associated with the packet received.

11. Download Operation

This section describes in more detail how the download process operates and fits into the existing IDU/ODU communication. As described earlier, the basic strategy is to insert the ODU software download process before normal IDU/ODU operations begin.

The downloading process preferably operates in a backward compatible manner with existing IDU software. In one embodiment, on startup, the IDU software repeatedly interrogates the ODU with either a "MODE" or an "IDENTIFY" command message. When the bootstrap module receives a response message other than a download command it checks to see if the Operational Software is available. If the software is available, it transfers control there immediately. If the Operational Software is not available, the ODU responds with an "unexpected command message" response message. Since the Operational Software will be picking up a message in midstream it will not recognize the remainder of the message, but since the IDU repeats these commands several times, the ODU should recognize the command on its next transmission.

For IDU software that includes commands for reprogramming the ODU, the first action of the IDU is to request partition information from the ODU. The partition interrogation process is discussed above.

An example of the partition information supplied by the ODU is:

```
typedef struct {
uint8 partition_number;
uint16   base_address;
uint8 type;         /* 'O' — operational software */
                    /* 'B' — bootstrap code      */
                    /* 'C' — calibration tables  */
                    /* 'H' — HW parameters       */
uint8 is_valid;
uint16   write_count;
uint8 version_number;
}
```

The partition_number field marks the response message from the ODU with the request generated by the IDU. This makes the ODU response message context-free in that the IDU does not need to know the context existing at the time the request was made to the ODU. The is_valid field determines whether the partition_number field in the record is valid. When an IDU command message contains a partition number outside the range of valid partitions in the ODU the is_valid in the response message will be FALSE.

The two fields "type" and "version_number" uniquely identify a piece of code and its version. These values are used by the IDU to determine if a software update is required. The IDU also is given the base address of each partition—this is provided by the base_address field. With this information, the IDU can determine which modules can be updated.

The write_count field tells the IDU how many times a partition has been overwritten. This is significant since in one embodiment the ODU processor flash is limited to a present number of write operations. In one embodiment, the preset number of write operations is 100. Keeping track of the write_count provides useful information particularly in lab conditions where test and development ODUs may be programmed relatively frequently.

Before the IDU downloads a module to the ODU, the IDU sets the write_count in the partition header of the module it is about download to the value of the write_count+1 of the partition it is about to overwrite.

If the IDU determines all modules in the ODU have revisions at least as recent as the versions available on the IDU, it exits the ODU software update process and normal IDU/ODU activity proceeds.

If the IDU determines some modules in the ODU are out of date, it initiates a download procedure for each module that is out of date.

12. Configuration Parameters

The Configuration Parameters area maintains the Calibration Parameters, Hardware Parameters, and ODU text parameters as discussed previously. The area is allocated according to the table below:

TABLE 33

Configuration Parameter Areas

| Name | Start | Length | Description |
| --- | --- | --- | --- |
| Configuration Parameters Partition Header | 0xF000 | 0x40 | Partition Header |
| Hardware Parameters | 0xF040 | 0x20 | Items describing hardware |
| Calibration Parameters | 0xF060 | 0x20 | Items set as a result of calibration |
| IF module ID string | 0xF080 | 0x80 | String up to 128 characters long |
| MMW ID string | 0xF100 | 0x80 | String up to 128 characters long |
| Power Supply ID string | 0xF180 | 0x80 | String up to 128 characters long |

The three ID strings are preferably used by external equipment. For this reason, their layout is unknown to all ODU software. In one embodiment, the ODU provides a space for up to 128 characters for each of the three strings.

The partition header description for Configuration Parameters does not include the ID strings. This avoids having to update the CRC in the header when anything in any of the strings changes. Since the strings are not used by any software in the ODU this has no ill effect on ODU performance.

The hardware and calibration parameters can be used by both the bootstrap and operational software. Because downloading new software does not occur at the same time as executing the operational software, the row buffer can be used to maintain a RAM copy of both the Calibration and Hardware parameters. Due to this feature, the download packet protocol can be used to alter and save both parameter sets. Accordingly, very little additional software in the ODU is required. Saving the values only requires the IDU to send a command message instructing the ODU to save the content of the row buffer to the location of the Calibration and Hardware parameters. It also provides a convenient mechanism for altering calibration parameters in real time, without having to perform a write to flash memory. Only after suitable settings of values have been reached do the values have to be committed to flash.

The table below provides the layout of the Hardware and Calibration Parameters.

TABLE 34

Hardware and Calibration Layout

| Parameter Name | Type | Offset | Bits | Description |
| --- | --- | --- | --- | --- |
| Is_Calibrated | C | 0 | 8 | if calibration is complete the value is 0x A5 otherwise calibration has not been completed |
| Max TX power | C | 1 | 8 | The maximum transmit power for this ODU |
| Min RX power | C | 2 | 8 | The minimum power this ODU can receive |
| Tx IF1 VVA | C | 3 | 8 | The nominal value for the TX IF1 VVA |
| <reserved> | | 4–60 | | Future expansion |
| CPU Type | H | 61 | 8 | The CPU resident on the ODU IF board  20 = 68HC908GP20  32 = 68HC908GP32 |
| Synthesizer Chip | H | 62 | 8 | The type of chip used for the LO generation  1 = LMX 2326  2 = LMX 2372 |
| Frequency Band | H | 63 | 8 | The band in which the ODU operates  24 = 24 GHz band  28 = 28 GHz band  31 = 31 GHz band |

To access and modify the ODU configuration parameters the "C" pseudo code interface below is illustrated. This interface is implemented on whichever host access to the parameters was required.

```
/*****************************************************
**************
**
**
*/
typedef enum {ILLEGAL_PARAM =                0,
              IS_CALIBRATED_PARAM =          0x1100,
              MAX_TX_POWER_PARAM =           0x1101,
              MIN_RX_POWER_PARAM =           0x1102,
              TX_IF1_VVA_PARAM =             0x1103,
```

-continued

```
                    ODU_CPU_PARAM =           0x113d,
                    SYNTHESIZER_CHIP_PARAM =  0x113e,
                    FREQUENCY_BAND_PARAM =    0x113f,
                    IF_MODULE_ID_PARAM =      0x2000,
                    MMW_MODULE_ID_PARAM =     0x4000,
                    PS_MODULE_ID_PARAM =      0x6000}
parameter_ID_type;
typedef enum {
      SUCCESSFUL,
      ILLEGAL_ROW,
      ILLEGAL_SIZE,
      ILLEGAL_OFFSET,
      CONFIGURATION_SAVE_FAILED
} Configuration_Parameter_Error_Codes_Type;
      /*
      ** parameter_ID_type: This is an enumeration type the tel
all the
      **                              functions in this mod
parameter is being
      **                              accessed. The value
provides
      **                              mapping information de
offset, size and
      **                              which row in the con
parameters area the
      **                              parameter is resident.
      */
void Set_Calibration_Parameter ( parameter_ID_type parameter_id,
                                                          uint32
      /*
      ** Sets the RAM image of the configuration parameter
described by
      ** 'parameter_id' to the value "value"
      */
uint32 Get_Calibration_Parameter ( parameter_ID_type
parameter_id);
      /*
      ** Returns the RAM image of the configuration parameter
described by
      ** 'parameter_id'
      */
void Set_Hardware_Parameter ( parameter_ID_type parameter_id,
                                                          uint32
      /*
      ** Sets the RAM image of the hardware parameter described
      ** 'parameter_id' to the value "value"
      */
uint32 Get_Hardware_Parameter ( parameter_ID_type parameter_id);
      /*
      ** Returns the RAM image of the hardware parameter descri
by
      ** 'parameter_id
      */
int Save_Configuration_Parameters ( void);
      /*
      ** This operation instructs the ODU to save the current
settings of
      ** Hardware and Calibration parameters to flash memory
      ** Returns 0 if successful, otherwise an error code.
      */
uint32 Get_Flash_Calibration_Parameter ( parameter_ID_type
parameter_id);
      /*
      ** Returns the value of the configuration parameter descri
by
      ** 'parameter_id. stored in flash.
      */
uint32 Get_Flash_Hardware_Parameter ( parameter_ID_type
parameter_id);
      /*
      ** Returns the hardware parameter described by
      ** 'parameter_id' stored in flash.
      */
char *Get_Flash_ID_String ( parameter_ID_type parameter_id,
                                                          char
                                                          int
      /*
      ** Retrieves the flash value of the id string described
      ** 'parameter_id" in the string pointed to by "text", up
```

```
"text_length" -1
        ** characters are retrieved from the ODU, the string is
always terminated
        ** with a NULL.
        */
void Set_Flash_ID_String ( parameter_ID_type parameter_id,
                                                    char
                                                    int
        /*
        ** Sets the flash value of the id string described by
'parameter_id' to the
        ** string pointed to by "text", the string is assumed be
null-terminated.
        ** Only the first 128 characters are written to the ODU.
        **
        ** Note: Setting an ID string implies transitioning out
operational mode,
        **            the values of any Hardware or Calibration
parameters that have been
        **            set but not saved will be lost.
        */
int Last_Error ( void);
        /*
        ** Returns an error code associated with the most recent
operation performed
        ** or 0 if no error occurred.
        */
```

13. ODU Access to Configuration Parameters

One of the first actions that occurs when the Operational Software initializes is copying the values of the Hardware and Calibration parameters stored in flash to the ROW buffer. After this occurs the operational software only references parameter values from their RAM location. This has several benefits. It ensures that operational software does not have to support "write" operations to flash memory. In addition, the Calibration and Hardware parameters can be changed by external means during operation (primarily calibration). Moreover, because the values are stored in RAM the changes take effect as soon as possible. Also, the three text strings are written to flash using the same download commands as used for transferring partitions, so no additional software is required.

14. Base Station Changes—Miscelleneous

The IDU preferably provides approximately 32 k bytes of storage for maintaining a copy of the current ODU download partition. It may alternately provide an additional 32 k temporarily when a new version is being loaded into the IDU, but before the previous version has been deleted.

E. OTHER EMBODIMENTS

Accordingly, it is to be understood that the invention is not to be limited by the specific illustrated embodiment, but only by the scope of the appended claims.

What is claimed is:

1. Customer premise equipment for use in a wireless communication system having a base station and customer sites, the customer premise equipment comprising:
  an outdoor comprising:
    a transmit path having first tuneable sub-components;
    a receive path having second tuneable sub-components;
    a detector adapted to generate a detector signal;
    a controller adapted to receive said detector signal, to tune said first tuneable sub-components and said second tuneable sub-components in response to received commands, to transmit information representative of said detector signal in response to a command, and
    a memory adapted to store instructions to control the operation of the controller; and
  an indoor unit comprising a modem for modulating/demodulating data transmitted between the base station and customer sites, said indoor unit further comprising a processor adapted to transmit commands to said controller, to detect a failure in the outdoor unit, and if a failure is detected in the outdoor unit then to write new instructions to said memory.

2. The system of claim 1, wherein the memory is selected from a group consisting of a FLASH memory, a programmable read only memory (PROM), an application specific integrated circuit (ASIC), a programmable array logic (PAL) integrated circuit and/or a field programmable gate array (FPGA).

3. The system of claim 1, wherein the memory comprises a FLASH memory within the controller.

4. The system of claim 1, wherein the processor is adapted to determine the content of the memory prior to storing the new instructions.

5. The system of claim 4, wherein the memory comprises memory partitions and the processor is adapted to determine the content of one or more of the memory partitions in the memory.

6. The system of claim 5, wherein processor is adapted to compare the content of the one or more memory partitions in the outdoor unit with the content of the new instructions.

7. The system of claim 6, wherein the processor is adapted to selectively store one or more portions of the instructions that differ from the content of the one or more memory partitions to the outdoor unit.

8. A system for storing updated software instructions to an outdoor unit in a wireless communication system, wherein the wireless communication system comprises at least one base station and one or more customer sites, comprising:
  an outdoor unit comprising software instructions stored in a memory, the memory comprising memory partitions;

an indoor unit comprising a copy of the stored software instructions; and first instructions within the indoor unit for detecting a failure in the outdoor unit, determining one or more locations of one or more of the memory partitions in the memory and, responsive to said failure, storing new software instructions to the memory in said outdoor unit based, at least in part, on said one or more locations.

9. The system of claim 8, wherein the memory is selected from a group consisting of a FLASH memory, a programmable read only memory (PROM), an application specific integrated circuit (ASIC), a programmable array logic (PAL) integrated circuit and/or a field programmable gate array (FPGA).

10. The system of claim 8, wherein the memory comprises a FLASH memory within a controller.

11. The system of claim 8, wherein the first instructions comprise instructions for determining the one or more locations of the one or more memory partitions prior to storing the new software instructions.

12. The system of claim 8, wherein the first instructions comprise instructions for comparing contents of at least one of the one or more memory partitions in the outdoor unit with contents of the new software instructions.

13. The system of claim 12, wherein the first instructions comprise instructions for selectively storing portions of the software instructions that differ from said contents of said at least of said one or more memory partitions to the outdoor unit.

14. A method for updating software instructions in an outdoor unit of a wireless communications system, wherein the wireless communication system comprises a plurality of base stations and customer sites, comprising:

detecting a failure of the outdoor unit to properly initialize;

reading software instructions from one or more memory partitions in the outdoor unit;

comparing the read software instructions with a stored copy the instructions;

identifying any altered memory partitions that comprise instructions differing from the stored copy; and storing new software instructions to the altered memory partitions.

15. The method of claim 14, wherein the memory partitions are selected from a group consisting of a FLASH memory partition, a programmable read only memory (PROM) partition, an application specific integrated circuit (ASIC) partition, a programmable array logic (PAL) integrated circuit partition and/or a field programmable gate array (FPGA) partition.

16. The method of claim 14, wherein the memory partitions comprise FLASH memory partitions within a controller.

17. The method of claim 14, wherein detecting a failure comprises instructing the outdoor unit to change operational modes and thereafter determining whether the outdoor unit changed operational modes.

18. The method of claim 14, wherein, reading software instructions comprises transmitting frequency shift key modulated software instructions from the outdoor unit to an indoor unit.

19. The method of claim 14, comprising counting the number of times that a memory partition is written.

20. The method of claim 19, comprising determining when a predetermined number of memory partition writes has taken place.

21. A method for programming an outdoor unit of a wireless communication system, wherein the wireless communication system comprises a plurality of base stations and customer sites, comprising:

instructing the outdoor unit to change to a designated operational mode;

determining whether the outdoor unit changes to the designated operational mode, wherein a determination that the outdoor unit did not change indicates an outdoor unit failure;

reading software instructions from one or more memory partitions in the outdoor unit;

comparing the read software instructions with a stored copy the instructions;

identifying any altered memory partitions that comprise instructions differing from the stored copy; and storing new software instructions to the altered memory partitions.

22. The method of claim 21, wherein the memory partitions are selected from a group consisting of a FLASH memory partition, a programmable read only memory (PROM) partition, an application specific integrated circuit (ASIC) partition and/or a gate array (FPGA) partition.

23. The method of claim 21, wherein the memory partitions comprise a FLASH memory partitions within a controller.

24. The method of claim 21, wherein instructing the outdoor unit to change operational modes comprises sending a control message to the outdoor unit.

25. The method of claim 21, wherein reading software instructions comprises transmitting frequency shift key modulated software instructions from the outdoor unit to an indoor unit.

26. The method of claim 21, comprising counting the number of times that a memory partition is written.

27. The method of claim 26, comprising determining when a predetermined number of memory partition writes has taken place.

* * * * *